(12) United States Patent
Takahashi et al.

(10) Patent No.: US 8,027,235 B2
(45) Date of Patent: Sep. 27, 2011

(54) DEFECT MANAGING METHOD AND DEFECT MANAGING DEVICE

(75) Inventors: Yoshihisa Takahashi, Osaka (JP); Motoshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 408 days.

(21) Appl. No.: 12/294,490

(22) PCT Filed: Mar. 27, 2007

(86) PCT No.: PCT/JP2007/056399
§ 371 (c)(1),
(2), (4) Date: Sep. 25, 2008

(87) PCT Pub. No.: WO2007/144118
PCT Pub. Date: Oct. 11, 2007

(65) Prior Publication Data
US 2010/0232276 A1      Sep. 16, 2010

(30) Foreign Application Priority Data
Mar. 31, 2006   (JP) .................. 2006-098820

(51) Int. Cl.
*G11B 7/00* (2006.01)
(52) U.S. Cl. ............ 369/53.17; 369/94; 369/47.14
(58) Field of Classification Search ............ None
See application file for complete search history.

(56) References Cited

U.S. PATENT DOCUMENTS

| | | | |
|---|---|---|---|
| 6,341,109 B1 * | 1/2002 | Kayanuma | 369/47.14 |
| 2002/0015378 A1 | 2/2002 | Komaki et al. | |
| 2002/0191319 A1 * | 12/2002 | Liew et al. | 360/53 |
| 2003/0137910 A1 | 7/2003 | Ueda et al. | |
| 2004/0145980 A1 * | 7/2004 | Park et al. | 369/47.14 |
| 2005/0270953 A1 | 12/2005 | Okada et al. | |
| 2006/0056088 A1 | 3/2006 | Kudoh et al. | |
| 2007/0189138 A1 * | 8/2007 | Kuroda et al. | 369/47.51 |

FOREIGN PATENT DOCUMENTS

| | | |
|---|---|---|
| JP | 7-72980 | 8/1995 |
| JP | 11-328674 | 11/1999 |
| JP | 2002-184116 | 6/2002 |
| JP | 2002-230834 | 8/2002 |
| JP | 2003-323769 | 11/2003 |

(Continued)

OTHER PUBLICATIONS

International Search Report issued PCT/JP2007/056399 Jun. 19, 2007 in the International (PCT) Application No. PCT/JP2007/056399.

International Preliminary Report on Patentability issued Oct. 30, 2008 in the International (PCT) Application No. PCT/JP2007/056399.

(Continued)

*Primary Examiner* — Joseph Haley
(74) *Attorney, Agent, or Firm* — Wenderoth Lind & Ponack, L.L.P.

(57) ABSTRACT

Performing sequential recording to alternate destinations of an information recording medium and improving access performance of accessing the information recording medium are achieved by estimating sequential defective areas of the information recording medium based on prescribed conditions, allocating blocks of a spare area as alternate destinations of the defective areas, and performing alternate recording to the allocated alternate destinations, in response to a recording request to record information to the sequential defective areas. The above can be achieved because the use of the alternate destinations will help to prevent a time-out from occurring due to he the defective areas.

18 Claims, 20 Drawing Sheets

RECORDED BLOCK       DEFECTIVE BLOCK

AT SEQUENTIAL RECORDING TIME

SEQUENTIAL DEFECT DETECTION   SEQUENTIAL DEFECT ESTIMATED AREA

AT RANDOM RECORDING TIME   SEQUENTIAL DEFECT DETECTION

SEQUENTIAL DEFECT ESTIMATED AREA

FOREIGN PATENT DOCUMENTS

| | | |
|---|---|---|
| JP | 2004-127459 | 4/2004 |
| JP | 2006-85789 | 3/2006 |
| WO | 2004/019326 | 3/2004 |
| WO | WO 2005088613 A1 * | 9/2005 |

OTHER PUBLICATIONS 120 mm (4,7 Gbytes per side) and 80 mm (1,46 Gbytes per side) DVD Rewritable Disk (DVD-RAM), Standard ECMA-330, Dec. 2001.

* cited by examiner

Fig.4

(1) STRUCTURE OF ALTERNATE ENTRY

| ALTERNATE ENTRY | ENTRY ATTRIBUTE (4 BITS, 30) | FIRST ALTERNATE INFORMATION (28 BITS, 31) | SUB-ATTRIBUTE (4 BITS, 32) | SECOND ALTERNATE INFORMATION (28 BITS, 33) |
|---|---|---|---|---|

(2) ALTERNATE ENTRY OF BD-RE

| ENTRY ATTRIBUTE (30) | | FIRST ALTERNATE INFORMATION (31) | SUB-ATTRIBUTE (32) | SECOND ALTERNATE INFORMATION (33) |
|---|---|---|---|---|
| RAD | RAD0 | ALTERNATE SOURCE PSN | — | ALTERNATE SOURCE PSN |
| RAD | RAD1 | ALTERNATE SOURCE PSN | — | ALTERNATE SOURCE PSN |
| NAD | | — | DEFECTIVE PSN | — | — |
| PBA | | — | DEFECTIVE PSN | — | SEQUENTIAL NUMBER OF BLOCKS |
| UNUSE | | — | — | — | DEFECTIVE PSN |

(3) ALTERNATE ENTRY OF BD-R

| ENTRY ATTRIBUTE (30) | FIRST ALTERNATE INFORMATION (31) | SUB-ATTRIBUTE (32) | SECOND ALTERNATE INFORMATION (33) |
|---|---|---|---|
| RAD | — | ALTERNATE SOURCE PSN | — | ALTERNATE SOURCE PSN |
| CRD | — | ALTERNATE SOURCE PSN | 0001 (START) | ALTERNATE SOURCE PSN |
| CRD | — | ALTERNATE SOURCE PSN | 0010 (END) | ALTERNATE SOURCE PSN |
| NRD | — | DEFECTIVE PSN | — | — |

| ENTRY ATTRIBUTE | FIRST ALTERNATE INFORMATION | SUB-ATTRIBUTE | SECOND ALTERNATE INFORMATION |
|---|---|---|---|
| CRD | a | HEAD | b |
| CRD | c | END | d |

30, 31, 32, 33

(2)

Fig.7
(1)
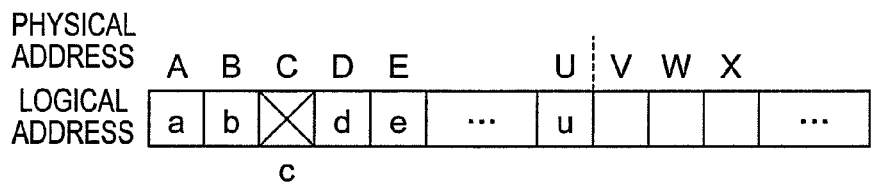
(2)
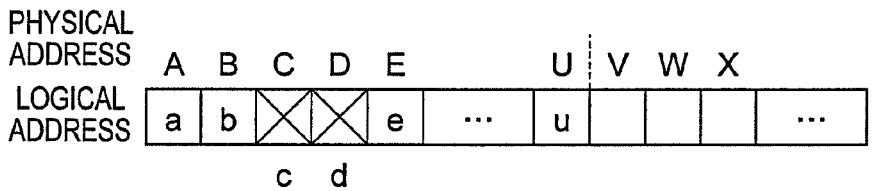

Fig.8
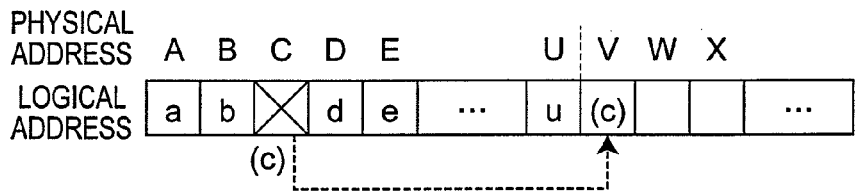
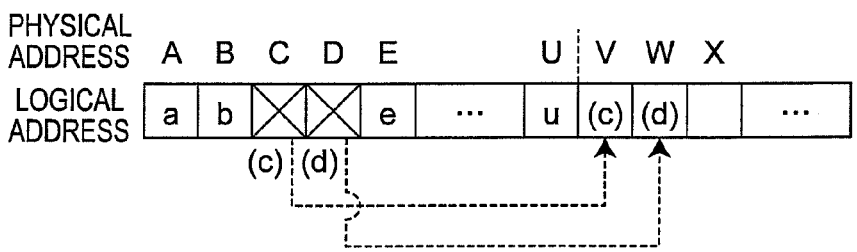
Fig.9
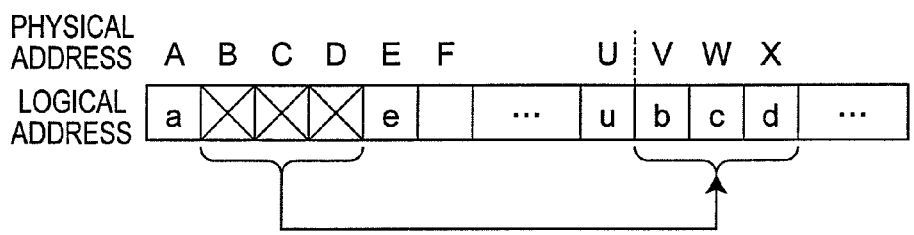

PRIOR ART
*Fig.22*
(1) AT NORMAL TIME
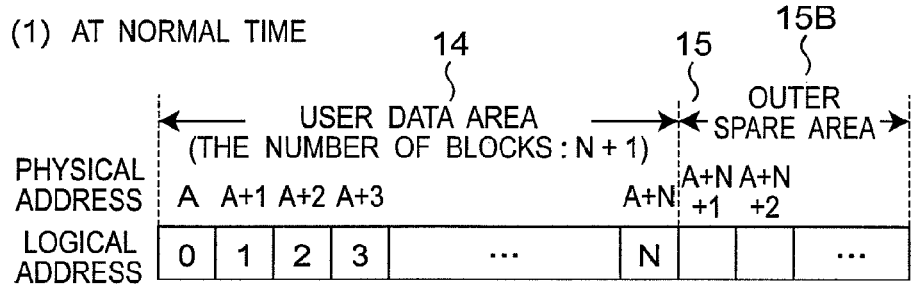
(2) WHEN DEFECTIVE BLOCKS EXIST
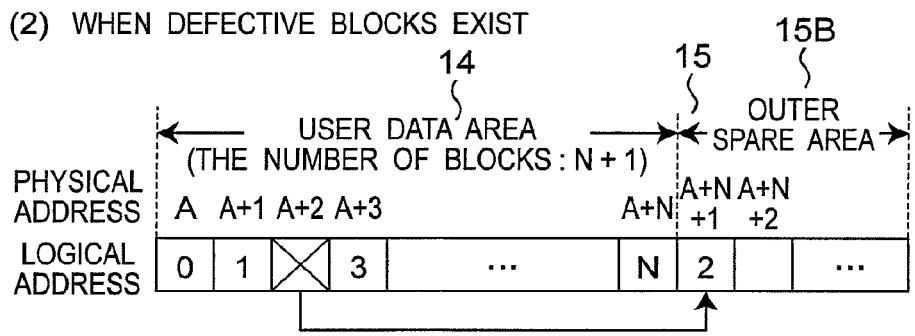
PRIOR ART
*Fig.23*
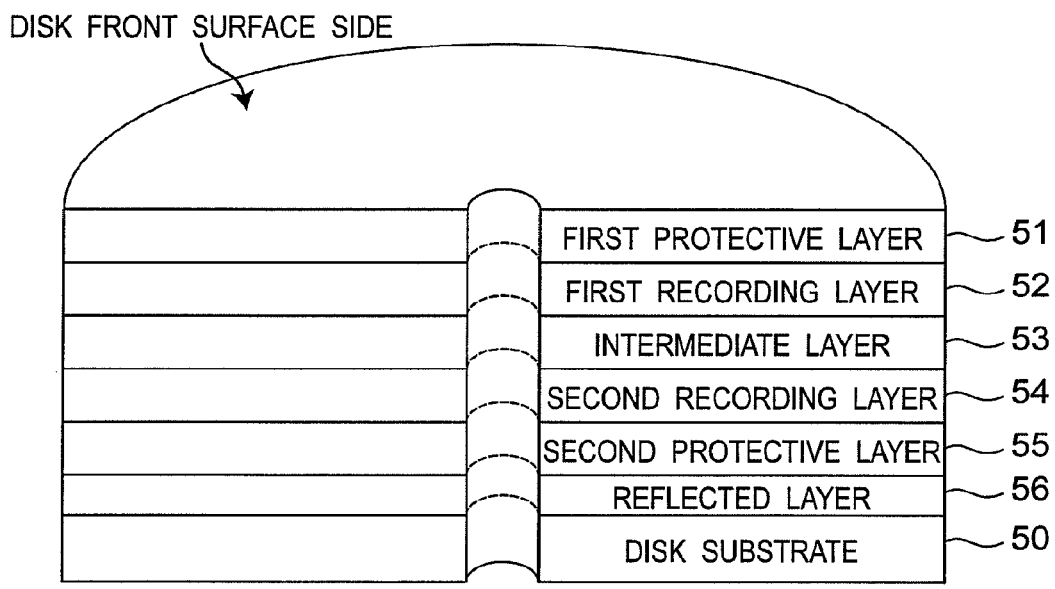

DEFECT MANAGING METHOD AND DEFECT MANAGING DEVICE

TECHNICAL FIELD

The present invention relates to a defect managing method and a defect managing device for an information recording medium having a defect managing function, and particularly relates to the defect managing method and the defect managing device effective for an optical disk having defects extending across a wide area, such as mix-in bubbles.

BACKGROUND ART

In recent years, a replaceable information recording medium of a large capacity and a disk drive device for driving this information recording medium are popularized.

As the replaceable information recording medium of a large capacity, an optical disk such as a DVD and a Blu-ray Disk (abbreviated as BD hereunder) is generally known. An optical disk recording/reproducing device for driving an optical disk is a device that performs recording/reproducing processing by forming an image of a minute beam spot on the optical disk by using laser beams, thereby changing physical characteristics of the information recording medium. For example, the optical disk recording/reproducing device performs recording/reproducing processing for the optical disk, being the information recording medium, by allowing the optical disk recording/reproducing device to undergo a phase change from a crystal state to an amorphous state to form a mark, etc., thereby performing recording/reproducing processing for this optical disk. The optical disk recording/reproducing device has a large capacity and is suitable for information recording that can be replaced [for example, see "120=(4, 7 Gbytes per side) and 80 mm (1, 46 Gbytes per side) DVD-Rewritable Disk (DVD-RAM)", Standard ECMA-330, December 2001]. As the laser beams, red laser beams are used for recording/reproducing of DVD, and blue laser beams having wavelengths shorter than those of the red laser beams are used in recording/reproduction of BD. Thus, BD has a higher recording density than that of DVD, and this contributes to realizing a large capacity.

FIG. 20 is a block diagram of a recording area of a general optical disk as the information recording medium. A plurality of tracks 2 are formed on a disk-shaped optical disk 1 in a spiral form, and a plurality of finely divided blocks 3 are formed on each track 2.

Here, the width of each track 2 of BD (track pitch) is set at 0.32 μm. Each block 3 is a unit of error correction, and is a minimum unit for performing recording and reproducing operation. For example, 1ECC (size: 32 KByte) is defined for DVD, and 1 cluster (size: 64 KByte) is defined for BD. When the unit of sector (size: 2 KByte), being a minimum unit of data of the optical disk, is used for explanation, equations such as 1ECC=16 sectors, 1 cluster=32 sectors, are established. Note that in the explanation given hereunder, when the unit is described as cluster, this is the same meaning as block 3 in the BD.

FIG. 21 is a view showing a data structure in a general recording type optical disk.

The optical disk 1 is divided into a read-in area 4 on the inner circumferential side, a read-out area 6 on the outer circumferential side, and a data area 5 between them.

As shown in FIG. 21, the data area 5 is constituted, having a user data area 14, and a spare area 15 having an inner spare area 15A and an outer spare area 15B.

The user data area 14 is an area in which arbitrary information can be recorded by a user, including real time data such as music and video, and computer data such as a text and a database.

The inner spare area 15A and the outer spare area 15B, being spare areas 15, refer to alternate areas in which data is recorded instead of being recorded into a certain block 3 (see FIG. 1) in the user data area 14. The inner spare area 15A and the outer spare area 15B are areas used as the alternate areas of the block, for example, when a defective block is detected in the user data area 14. FIG. 21 is a view showing a case in which the spare areas 15 exist one by one on the inner circumferential side of the data area (namely, read-in area side) and the outer circumferential side (namely, read-out area side). Alternate recording has a merit of enhancing the reliability of data, by alternately recording data from the defective block in the user data area 14 to the block in the inner spare area 15A or the outer spare area 15B, being alternate areas. However, in the alternate recording, recording must be performed by moving (seeking) from the user data area 14, being presently accessed, to the inner spare area 15A or the outer spare area 15B, being another areas. Therefore the alternate recording has a demerit that processing time is prolonged, and recording/reproducing performance is deteriorated.

The read-in area 4 is an area arranged on the inner circumferential side from the data area 5 in a diameter direction of the optical disk 1, and the read-out area 6 is an area arranged on the outer circumferential side from the data area 5 in the diameter direction of the optical disk 1. These read-in area 4 and the read-out area 6 serve as areas in which management information, etc., regarding the optical disk 1 is stored, and over-run of optical pickup (not shown) is prevented.

The read-in area 4 includes a first defect management area 10 (abbreviated as DMA1 hereunder) and a second defect management area 11 (abbreviated as DMA2 hereunder). Both of the DMA1 and DMA2 are areas for recording management information of the optical disk 1 such as the information regarding a data structure and a defect of the optical disk 1.

The read-out area 6 includes a third defect management area 12 (abbreviated as DMA3 hereunder), and a fourth defect management area 13 (abbreviated as DMA4 hereunder). Both of the DMA3 and DMA4 are areas for recording the management information of the optical disk 1 such as the information regarding the data structure and the defect of the optical disk 1.

Although the DMA indicates the defect management area as described above in a more limited sense, it can also indicate various kinds of information (disk management information) regarding the optical disk 1, other than the defect management information. Therefore, the DMA is treated here, as the area having the meaning of a disk management area in a broad sense.

DMA1 to DMA4 thus constituted are respectively arranged at a prescribed position in the optical disk 1, and multiple recording of the same information is performed in each of the DMA1 to DMA4. This is performed in preparation for a case that any one of the DMA1 to DMA4 is defective. With this structure, even if there is the DMA that can not be reproduced correctly, the defect management information of this optical disk 1 can be acquired, provided that there is any one of the DMA1 to DMA4 that can be reproduced correctly.

The DMA1 to DMA4 has a disk definition structure 20 (abbreviated as DDS20 hereunder) and a defect list 21 (abbreviated as DFL21 hereunder), respectively (see FIG. 2).

DFL21 is the information including the information regarding alternate processing such as alternate recording performed for the defective block (alternate entry including an address of an alternate source and an address of an alternate destination, due to the defect). Here, the information regarding the alternate processing is the alternate entry including the address of the alternate source and the address of the alternate destination, due to the defect.

The address showing positional information of the block 3 of the optical disk 1 will be explained hereunder.

Generally, when access processing such as recording/reproduction is applied to the optical disk 1, control is performed by using the address physically provided on a recording layer of the optical disk 1 (physical address: abbreviated as PSN hereunder), and the address virtually and sequentially given to the area that can be accessed from a user such as a host device, namely to the data area 5, being a logic space (logical address: abbreviated as LSN hereunder). Note that these addresses are generally allocated to a sector unit or by setting prescribed numbers in the block 3 as one unit.

FIG. 22 is an explanatory view for simply explaining a relation between PSN (physical address) and LSN (logical address). Note that in FIG. 22, in order to simplify the explanation of the PSN and LSN allocated to a normal sector unit, explanation is given in a block unit.

(1) of FIG. 22 shows the relation between the PSN and LSN in the optical disk 1.

In a case of BD-RE, being a rewritable BD, the address called ADIP given to the track 2 on the optical disk 1, namely on a wall surface of a recording groove in an undulating form (wobble), and the address called AUN given to the data recorded in the block 3, correspond to the PSN. Meanwhile, LSN shows address information, and a series of numbers starting from 0 are virtually sequentially given to the LSN. As shown in (1) of FIG. 22, normally, LSN is the address sequentially allocated to all blocks 3 in the user data area 14, with its head block set at 0. Thus, the LSN at normal time corresponds to the PSN allocated to the corresponding block 3 in the user data area 14, one to one. For example, LSN=0 corresponds to PSN=A, and LSN=1 corresponds to PSN=A+1, and LSN=2 corresponds to PSN=A+2. Such a PSN (physical address) at normal time is abbreviated as offset PSN (physical address) in the explanation given hereunder.

However, for example, when a certain block in the user data area 14 is defective, and alternate recording is performed in a spare area, the LSN supposed to be allocated to the defective block in the user data area 14 is allocated to the block in the spare area used as the alternate destination.

(2) of FIG. 22 is a view showing an example of a case in which the blocks of PSN (A+2) in the user data area 14 are the defective blocks, and alternate recording is performed to the blocks of PSN (A+N+1) in the outer spare area 15B. In such a case, LSN (2) supposed to be allocated to the blocks of PSN (A+2), being the defective blocks, is allocated to the blocks of PSN (A+N+1) in the outer spare area 16, being the alternate destination. Therefore, the PSN corresponding to the LSN (2) is expressed by PSN (A+N+1). Thus, when the defective block exits, the PSN is abbreviated as an actual access PSN in the explanation given hereunder.

Therefore, in order to obtain the actual access PSN for actually accessing the data area based on the LSN requested from the host device, processing described hereunder is performed.

1) The LSN is converted into offset PSN (abbreviated as offset conversion hereunder).
2) Whether or not the offset PSN is alternate-recorded, is verified based on the DFL21.

When the offset PSN is not alternate-recorded, the offset PSN is calculated as the actual access PSN.

When the offset PSN is alternate-recorded, the PSN of the alternate destination is calculated as the actual access PSN.

A disk structure of the optical disk 1 will be simply explained hereunder, with reference to FIG. 23.

FIG. 23 is a schematic view of the optical disk 1, showing a sectional face of a recording type BD having two layers of recording layers. In the recording type BD, generally a reflective layer, a protective layer, and a recording layer are laminated on a disk substrate 50. In the recording BD shown in FIG. 23, a first protective layer 51, a first recording layer 52, an intermediate layer 53, a second recording layer 54, a second protective layer 55, and a reflective layer 56 for reflecting the laser beams are formed sequentially from its front side. The first protective layer 51 protects the first recording layer 52 for storing data, and the second protective layer 55 protects the second recording layer 54 for storing data. The intermediate layer 53 exists in between the first recording layer 52 and the second recording layer 54, having a function similar to the function of the first protective layer 51 and the second protective layer 55. The recording type BD thus constituted is irradiated with the laser beams from the front side of the disk, and recording/reproducing processing of the data is performed to the first recording layer 52 and the second recording layer 54.

As a conventional manufacturing method of BD, a method of laminating a plurality of films corresponding to each layer on the disk substrate 50 is used.

However, in the method of manufacturing the optical disk by laminating the films, the step of forming the film is required, and also the step of laminating the films is required, thus involving a problem that the manufacturing step is increased, time required for manufacture is prolonged, manufacturing cost is increased, and a price of the disk is accordingly increased. Therefore, in recent years, the manufacturing method using a spin-coat technique has been focused. Briefly speaking, the manufacturing method of the optical disk using this spin-coat technique is a technique in which film forming resin is dropped on a high speed rotating substrate, and by using a centrifugal force generated by rotation, the resin is pervaded evenly on the substrate, thus forming a recording film and a protective film.

However, the optical disk using such spin-coat technique involves a problem that air is mixed in the film such as recording layer and protective layer, namely there is a high possibility that air bubbles exists in the film. For example, when a thickness of the second protective layer 55 is 100 μm, the size of each bubbles is 100 μm at maximum when the bubbles has approximately a spherical shape, and the area where the bubbles are mixed becomes a large defective area. Further, the defective area is not applied only to the area where the bubbles are mixed, but is applied to the area where foreign matters are mixed, resulting in a large defective area in this optical disk.

When the recording/reproducing processing is performed to the optical disk thus having a large defective area, in the optical disk recording/reproducing device, normal reflected light to the laser beams can not be obtained from the area where defect such as a bubbles exists. Therefore, the block having such an area is treated as the defective block, and the data to be recorded in this defective block is alternately-recorded in the spare areas 15, being the alternate area.

FIG. 24 is a conceptual view of the optical disk 1 when the bubbles exist in the film of the optical disk 1. In the optical disk 1 shown in FIG. 24, each area shown by designation marks A to N corresponds to the block 3, and for example, one track 2 is constituted of a block A and a block B on the innermost circumferential side.

As described above, the track pitch of BD is set at 0.32 μm, and meanwhile the size of each bubble is, for example, about 100 μm. Therefore, about 300 tracks are influenced by one bubble, resulting in allowing a plurality of defective blocks to exist. In addition, as shown in FIG. 24, depending on a state of the bubbles, not only a range in which actual bubbles exists, but also the surrounding area is influenced by the bubbles, with a place where the bubbles exit set as a center, and in some cases, the defective area exists in a range of about 300 μm, which is about three times the size of the bubbles, for example. In the BD, for example in a case of the data area 5 on the inner circumferential side, as shown in FIG. 24, about two clusters (two blocks) are included in one track. Therefore, a normal cluster and a defective cluster influenced by the bubbles are mixed every other cluster. As a result, alternate recording occurs every time recording is performed to the defective cluster (defective block).

Here, in order to improve the recording/reproducing performance, a case that the optical disk recording/reproducing device has a cache function is considered. The cache function is a function of operating, for the purpose of increasing a command (request) response processing speed between the host device and the optical disk recording/reproducing device. Specifically, when reception of the recording data is completed by a cache memory provided in the optical disk recording/reproducing device, in response to a recording request from the host device, the command completed before recording is actually performed to the optical disk. Then, the optical disk recording/reproducing device realizes improvement in the command response processing speed, by performing actual recording processing to the optical disk 1 at an arbitrary timing thereafter.

In a state that the optical disk recording/reproducing device sequentially receives the data whose recording is requested from the host device such as a host PC in a cache effective state, but the data is not recorded yet, namely the data to be recorded is set in a state of still being on the cache memory, and when a reading request is given from the host device, unrecorded data held by the cache memory is recorded in the optical disk 1 and then read-out processing of the data of the requested area is performed. However, at this time, when the recording destination is the area including the bubbles as described above, the alternate recording occurs frequently, thus further increasing the processing time, and a long time is required for executing the read-out processing. In the PC (personal computer), time-out of the request (command) from the host device is normally 7 seconds, or 7.5 seconds. Therefore, in the aforementioned case, a problem is that there is a high possibility of time-out of the read-out request.

Further, there is also a case that the cluster which is impossible to be executed tracking exists, depending on a sate of the bubbles. Regarding the optical disk 1 having such a cluster, of course data recording/reproducing processing can not be performed and the AUN, being the PSN (physical address) can not be acquired, and also the reflected light by wobble given to the track 2 (recording groove) of an object cluster can not be correctly acquired. Accordingly, the ADIP address read-out by the change in the wavelengths of the reflected light can not be acquired. Therefore, there is a high possibility that the optical disk 1 is set in a state in which the PSN can not be read-out.

In order to perform fixing processing (synchronization processing) of an access position when a target address is accessed, generally, the optical disk 1 adopts a method of moving (seeking) an optical head to the area in front of the area of the target address, then by a focus servo, making the optical head reach the area of the target address along the track 2 with the help of the reflected light from the track 2 by using the rotation of the optical disk 1, and preparing for emission of the recording/reproducing laser beams from the target address. However, the reflected light from the track 2 can not be acquired by mix-in of the bubbles, thus making it impossible to execute a tracking servo, and the minute beam spot can hardly be scanned along the track 2.

Therefore, there is a possibility of occurrence of problems that as well as the cluster in which the bubbles are mixed, the other cluster that follows the cluster having the mixed bubbles can not be accessed as a result. Specifically, for example, as shown in FIG. 24, when the areas of blocks I, K, M are influenced by the bubbles, the addresses of these blocks can not be acquired, thus making it impossible to specify the present position tracked by optical beams. Therefore, there is a case that the successive blocks J, L, N can not be accessed either.

FIG. 25 is an explanatory view showing a case in which the bubbles exist in the film of the recording type BD disk (in this case, in the second protective layer 55). As shown in FIG. 25, the defect due to the bubbles and foreign matters is thereby set in a state of a swollen film. Namely, the defect in this state has a sterically concavo-convex shape. The size of such a kind of defect is about several hundreds μm at largest, and unlike a scratched scar that can be actually verified by the naked eye of a human being, it is significantly difficult to observe the aforementioned defect by the naked eye. In addition, particularly in a case of the defect due to bubbles mixing out of the defects due to mixing of foreign matters, even if the corresponding place is expanded by using a microscope, the film of the front and back area undulates like a concentric wave, with the bubbles set as the center, in an actual disk, in addition to a place of the bubbles itself that can be actually visually observed. Therefore, there is a significantly high possibility that even the area around the bubbles also becomes the defective area that can not be accessed in performing the recording/reproducing processing. Namely, a size of a range of the defective area due to the bubbles corresponds to a total size of the size of the bubbles itself having a visible solid shape and about the same size of the bubbles in the back and forth of these bubbles. In other words, the size of the defective area due to the bubbles is about three times the size of the bubbles having a solid shape.

In the optical disk recording/reproducing device that performs recording/reproducing processing to aforementioned optical disk, a normal reflected light to the laser beams can not be obtained from the area in which the defect such as bubbles exist. Therefore this area is treated as the defective block, and the data is alternately recorded in the spare areas, being the alternate areas, by the optical disk recording/reproducing device, the data being supposed to be originally recorded in this defective block.

In addition, as shown in FIG. 25, in a case of a multi-layer disk having a plurality of recording layers, when the bubbles exist in the film of the optical disk, particularly between a disk surface, being the side irradiated with the laser beams and the reflective layer 56 for reflecting the irradiated laser beams, access fails to the area corresponding to a position of almost the same radius as that of the position where the bubbles exist, in not only the second recording layer 54 close to the bubbles but also in the first recording layer 52, being the other recording layer. Namely, the area becomes the defective area in each recording layer, by existence of one bubble.

Each kind of technique is proposed in a field of a defect management method in a conventional optical disk recording/reproducing device, in order to respond to an unfavorable circumstance such as an existence of the defective block when the tracking servo is executed based on a recording signal. For example, as an example of the defect management method, there is a technique in which the area including the defective block and a subsequent prescribed range is treated as the defective area, and information of a list of this defective area is registered, and when reproducing operation is performed, avoiding access to the defective area, the alternate destination is to be accessed, thereby making it possible to perform reproducing operation without being influenced by the defective block. This technique is disclosed, for example, in Japanese Patent Laid Open Publication No. 2002-184116.
Patent Document Japanese Patent Laid Open Publication No. 2002-184116
Non-patent Document 1: 120 mm (4, 7 Gbytes per side) and 80 mm (1, 46 Gbytes per side) DVD-Rewritable Disk (DVD-RAM)2, Standard ECMA-330, December 2001

SUMMARY OF THE INVENTION

Problems to be Solved by the Invention

However, according to the aforementioned conventional technique, when the defective block is detected, the defective block and a subsequent prescribed range are always treated as the defective areas, irrespective of a state of the defective block such as success/failure in acquisition of a signal from the defective block. Therefore, the conventional technique is effective for a write-once optical disk, but can not respond to, for example, a rewritable optical disk in some cases, which is a case that the data is already recorded in a block next to the block temporarily judged to be defective. In a case of the block judged to be the defective block due to a thin stain adhered to the surface of the disk, a minimum recording signal for controlling the servo can be acquired in some cases. Therefore, the block next to the block judged to be defective can be correctly accessed. In such a case also, according to the aforementioned conventional art, the block of a prescribed range subsequent to the defective block is forcibly treated as the defective block, so that the alternate area of the alternate destination is accessed. Here, when read-out request is given regarding the data for the block next to the defective block, the alternate destination is accessed. At this point, of course, the data is not recorded in the alternate destination, and therefore there is a problem that read-out of the data can not be correctly performed.

Further, the size of the spare area that can be used as the alternate destination is limited. Therefore, even in a case of the defect not caused by bubbles but caused by stain, the blocks of a prescribed range subsequent to the defective blocks are always sequentially treated as the defective blocks. Accordingly, when the stain such as a finger print that is thinly spread in a wide range is adhered to the surface of the disk, there is a problem that the spare areas, being the alternate areas, are used up immediately.

In view of the above-described problems, the present invention is provided, and an object of the present invention is to realize the defect management method capable of correctly controlling the recording/reading-out of the data even if a read-out command is received in the middle of the operation, while realizing improvement in a processing performance by the cache memory, and provide the defect management device with high reliability.

Means for Solving the Problems

A first aspect of the present invention provides a defect management method having a plurality of layers including a plurality of recording layers, for an information recording medium in which recording/reproducing processing is performed in a block unit of an error correcting unit, the method including:

in case that a defective block which meets a prescribed defect judgment condition is detected in one recording layer, registering an area of a prescribed range decided on the basis of the defective block in the recording layer in a defect list as a defective area; and registering in the defect list, an area of a range in other recording layer of the plurality of recording layers corresponding to a position of the same radius as the radius of the prescribed range, as the defective area.

According to the defect management method of the present invention thus constituted, it is possible to correctly estimate the defective area and respond thereto at an early stage, the defective area being extensively invaded by foreign matters such as bubbles. In addition, according to the defect management method of the present invention, even if a read-out command is received in the middle of operation, recording/reading-out of data can be correctly controlled.

A second aspect of the present invention provides the defect management method according to the first aspect, wherein a block in which recording/reproducing processing can not be correctly performed under an influence of irregularities generated on the layers, which is caused by foreign matters of solid shape that exist in the layers, may be decided as the defective block.

A third aspect of the present invention provides the defect management method according to the first aspect, wherein in the recording processing of data to the block, a case in which error due to any one of the factors such as tracking error or failure of address read occurs sequentially in a specific direction for a prescribed number of times may be set as the prescribed defect judgment condition.

A fourth aspect of the present invention provides a defect management method, wherein the information recording media of the first aspect includes a spare area for replacing a defective block, wherein hereunder step can be included:

successively allocating blocks to the spare areas which is alternate areas of the defective block included in the defective area.

A fifth aspect of the present invention provides the defect management method according to the first aspect, wherein hereunder steps can be included:

registering in the defect list, a prescribed range backward of the defective block as a defective area, when the defective block which meets the prescribed defect judgment condition is detected during sequential recording, and registering in the defect list, the prescribed range frontward and backward of the defective block, which is set as a reference, as the defective area, when the defective block which meets the prescribed defect judgment condition is detected during random recording.

A sixth aspect of the present invention provides the defect management method according to the first aspect, wherein the prescribed range may correspond to a range in which tracking error or failure of address read occurs in an inspection performed to the area decided on the basis of the defective block as a reference.

A seventh aspect of the present invention provides the defect management method according to the second aspect, wherein a size of the prescribed range may correspond to an area having a size corresponding to substantially three times a diameter of a foreign matter, with the foreign matter having a solid shape that exists in the layer set as a center.

An eighth aspect of the present invention provides the defect management method according to the fourth aspect, wherein the information recording medium has a plurality of spare areas, and when blocks can not be sequentially allocated to any one of the spare areas as an alternate destinations of the defective block included in the defective area, a spare area to which a longest sequential block can be allocated as the alternate destination of the defective block be preferentially used.

A ninth aspect of the present invention provides the defect management method according to the fourth aspect, wherein recording into the defective area can be controlled as the recording into the area of the alternate destination, by registering an alternate entry in the defect list before recording into the defective area, and the alternate entry includes alternate source position information which is a position of the defective block included in the defective area, alternate destination position information which is a position of a block in the spare area, and attribute information showing allocation of the alternate destination.

A tenth aspect of the present invention provides the defect management method according to the fourth aspect, wherein recording into the defective area can be controlled as the recording into an area of the alternate destination, by registering an alternate entry in the defect list before recording into the defective area, and the alternate entry includes alternate source position information which is a position of the defective block included in the defective area, alternate destination position information which is a position of a block in the spare area, and attribute information showing information registered before being recorded into the defective area.

An eleventh aspect of the present invention provides the defect management method according to the fourth aspect, wherein position information regarding the defective area is temporarily stored, and recording into a block included in the defective area can be controlled as the recording into an area of the alternate destination.

A twelfth aspect of the present invention provides a defect management device for an information recording medium having a plurality of layers including a plurality of recording layers, for performing recording/reproducing processing in a block unit of an error correcting unit, the defect management device comprising:

a system control part which performs control of an overall device;

a memory part which stores each kind of information temporarily for performing control by the system control part;

a motor part which rotates the information recording medium;

an optical pickup part which records data into the information recording medium or reads the data from the information recording medium;

a data buffer which stores data to be recorded and read-out data temporarily; and a DFL information storage buffer that holds a defect list having information regarding a defective block of the information recording medium, wherein when the system control part detects the defective block in one recording layer, which meets a prescribed defect judgment condition, an area of a prescribed range decided on the basis of the defective block in this recording layer, is registered in the defect list as a defective area, and an area of a range in other recording layer of the plurality of recording layers corresponding to the same radius position as that of the prescribed range is registered in the defect list as the defective area.

According to the defect management device thus constituted, it is possible to estimate and respond to the defective area extensively invaded by foreign matters such as bubbles, correctly at an early stage. In addition, according to the defect management device of the present invention, even if a read-out command is received in the middle of operation, it is possible to correctly record/read-out the data, thus making it possible to realize the defect management device with high reliability.

A thirteenth aspect of the present invention provides the defect management device according to the twelfth aspect, wherein the system control part can be constituted to apply processing to a block not capable of performing recording/reproducing processing normally under an influence of irregularities generated in the layer due to a foreign matter having a solid shape that exists in the layer, and this block is processed by the system control part as the defective block.

A fourteenth aspect of the present invention provides the defect management device according to the twelfth aspect, wherein the system control part can be constituted to judge following case to be a prescribed defect judgment condition, when error due to the factors of either one of tracking error and failure of address read occurs sequentially in a specific direction for a prescribed number of times, in recording processing of data into a block.

A fifteenth aspect of the present invention provides the defect management device according to the twelfth aspect, wherein the information recording medium can be constituted to include a spare area for replacing a defective block, and a block is sequentially allocated to the spare area which is an area of an alternate destination of the defective block included in the defective area.

A sixteenth aspect of the present invention provides the defect management device according to the twelfth aspect, wherein the system control part can be constituted to perform as described hereunder: when the system control part detects a defective block which meets the prescribed defect judgment condition during sequential recording, a prescribed range backward of the defective block is registered in the defect list as a defective area, and when the system control part detects a defective block which meets the prescribed defect judgment condition during random recording, the prescribed ranges frontward and backward of the defective block set as a reference are registered in the defect list as the defective area.

A seventeenth aspect of the present invention provides the defect management device according to the twelfth aspect, wherein the prescribed range can be a range in which tracking error or failure of address read occurs in an inspection performed to an area decided on the basis of the defective block.

An eighteenth aspect of the present invention provides the defect management device according to the thirteenth aspect, wherein the prescribed range can be an area having a size corresponding to substantially three times a diameter of a foreign matter, with the foreign matter having a solid shape that exists in the layer set as a center.

A nineteenth aspect of the present invention provides the defect management device according to the fifteenth aspect, wherein the information recording medium can be constituted to include a plurality of spare areas, and in the spare areas which are alternate destinations of the defective block included in the defective area, when blocks can not be allocated sequentially, a spare areas to which a longest sequential block can be allocated as the alternate destinations of the defective block be preferentially used.

A twentieth aspect of the present invention provides the defect management device according to the fifteenth aspect, wherein the system control part can be constituted to set recording into the defective area as the recording into the alternate destination, by registering the alternate entry in the defect list before recording this alternate entry into the defective area, and the alternate entry includes alternate position information which is a position of the defective block included in the defective area, alternate destination position information which is a position of a block in the spare area, and attribute information showing allocation of the alternate destination.

A twenty-first aspect of the present invention provides the defect management device according to the fifteenth aspect, wherein the system control part can be constituted to set recording into the defective area as the recording into the alternate destination, by registering the alternate entry in the defect list before recording this alternate entry into the defective area, and the alternate entry includes alternate source position information which is a position of the defective block included in the defective area, alternate destination position information which is a position of a block in the spare area, and attribute information showing that information is registered into the defective area before being recorded into the defective area.

A twenty-second aspect of the present invention provides the defect management device according to the fifteenth aspect, wherein position information regarding the defective area can be temporarily stored in the memory part, and recording into a block included in the defective area can be set as recording into an area of the alternate destination.

According to the defect management method and the defect management device thus constituted, it is possible to correctly estimate the defective area extensively invaded by foreign matters such as bubbles, at an early state. Also, according to the defect management method of the present invention, while the area of a prescribed range successive to the detected defective block is treated as the defective area, sequential alternate recording into the alternate area such as the spare area is performed, for a recording request into this defective area. Further, by performing control so that read-out from the alternate destination is sequentially performed for the read-out request after executing the alternate recording, improvement in processing performance is achieved, and time-out of the recording/read-out request from a host device can be prevented. In addition, correct read-out of data can be performed by performing control so that read-out is performed not from the alternate destination but from an area that receives a request when a read-out request is given before executing the alternate recording. Further, according to the defect management method of the present invention, comprehensive judgment is possible in consideration of a state of the area in the vicinity of the block judged to be defective, thus making it possible to provide a function of deciding an area with high precision, which is required to be sequentially alternated, in the information recording medium.

Effect of Invention

According to the present invention, problems in a conventional technique can be solved, and a defect management method and a defect management device with high reliability can be provided, which is capable of correctly controlling recording/reading-out of data, even if a read-out command is received in the middle of recording/reading-out operation, while improvement in processing performance is realized by a cache memory.

BRIEF DESCRIPTION OF DRAWINGS

FIG. 4 is an explanatory view regarding alternate entry of BD, being an optical disk;

FIG. 5 is an explanatory view regarding CRD attribute of BD-R, being a write-once type optical disk;

FIG. 7 is an explanatory view of calculation of the sequential accessible number, for NRD attribute and PBA attribute, in the optical disk recording/reproducing device according to the embodiment 1 of the present invention;

FIG. 8 is an explanatory view of calculation of the sequential accessible number for RAD1 attribute in the optical disk recording/reproducing device according to the embodiment 1 of the present invention;

FIG. 9 is an explanatory view of the sequential accessible number for CRD attribute in the optical disk recording/reproducing device according to the embodiment 1 of the present invention;

FIG. 22 is the explanatory view showing a relation between the physical address and the logical address in the general optical disk;

FIG. 23 is the explanatory view showing the disk sectional structure of the general optical disk;

DETAILED DESCRIPTION OF THE INVENTION

A defect management method and a defect management device will be explained hereunder, by using an optical disk recording/reproducing device according to preferred embodiments of the present invention, with reference to the attached drawings.

Note that the optical disk recording/reproducing device of each embodiment hereunder will be explained, by giving an optical disk, particularly BD (Blu-ray Disk) as an example.

Embodiment 1

In the optical disk recording/reproducing device, regarding a recording/read-out processing request given to an information recording medium from a host control device, either one of roughly classified normal processing (abbreviated as PC processing hereunder) and stream processing is executed. Simply speaking, the PC processing refers to the processing of performing alternate recording to an alternate destination such as a spare area, or the processing of performing read-out operation from the alternate destination, which is a method extensively used in PC (personal computer), etc., in which reliability of data is required. Meanwhile, the stream processing refers to the processing of not performing alternate recording into the alternate destination such as the spare area and read-out operation from the alternate destination, which is a method extensively used in a recorder device in which real time property of the processing is required.

The optical disk processing/reproducing device according to the embodiment 1 of the present invention will be explained, with a case of PC processing given as an example.

(1) Structure of the Optical Disk Recording/Reproducing Device

Figure 1:
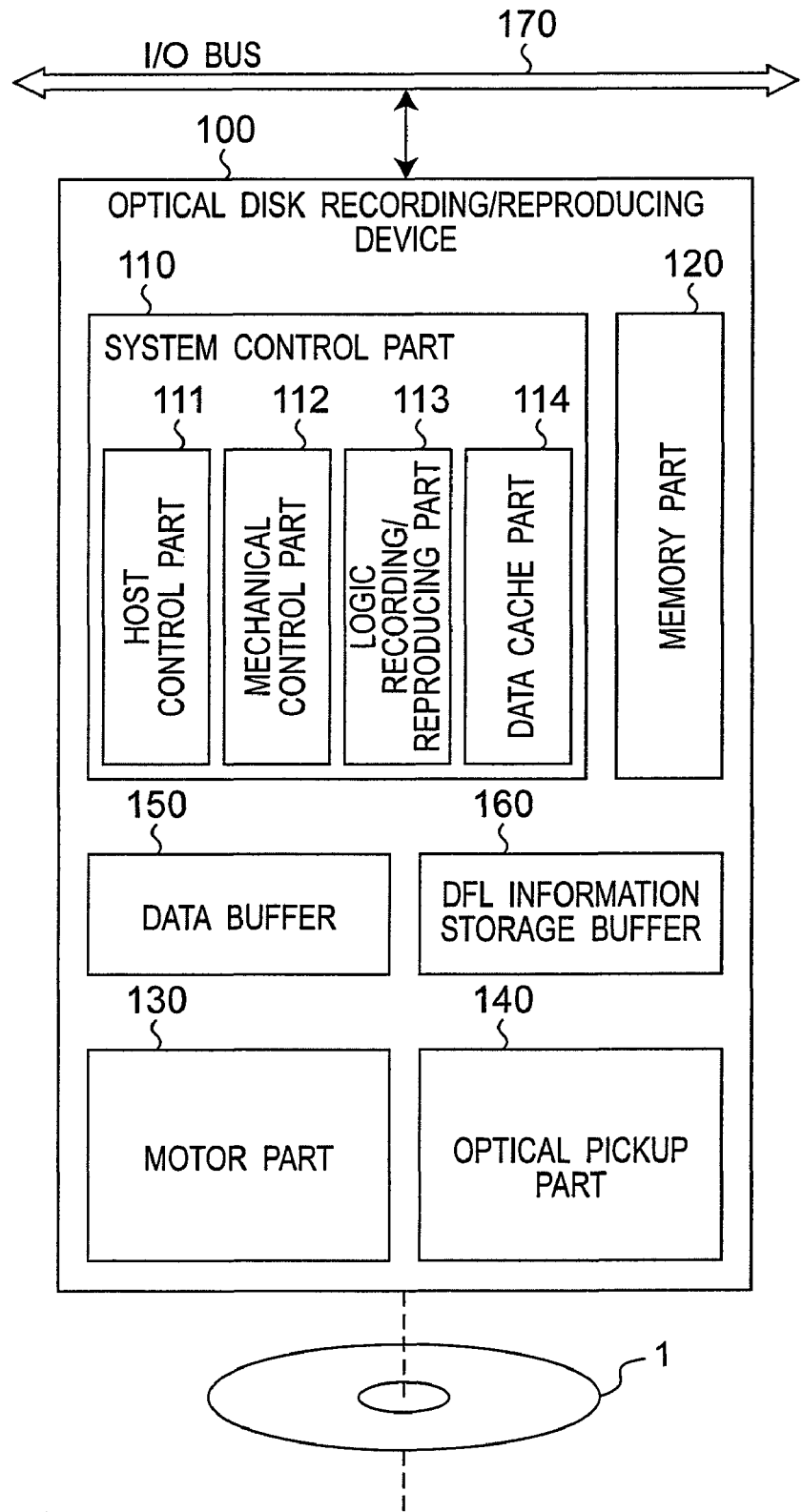
FIG. 1 is a block diagram showing a structure of an optical disk recording/reproducing device according to an embodiment 1 of the present invention.

FIG. 1 is a block diagram showing the structure of an optical disk recording/reproducing device 100 according to an embodiment 1 of the present invention.

The optical disk recording/reproducing device 100 is connected to the host control device (not shown), via an I/O bus 170. As the host control device, for example, a host computer, being a host device, is given as an example.

The optical disk recording/reproducing device 100 functionally includes a system control part 110 that performs control of an overall optical disk recording/reproducing device 100; a memory part 120; a motor part 130 that rotates an optical disk 1; an optical pickup part 140; a data buffer 150; and a defect list information storage buffer (abbreviated as a DFL information storage buffer hereunder) 160. The memory part 120 temporarily stores each kind of information used in performing control by the system control part 110. The motor part 130 rotates the optical disk 1, for performing recording/reading-out of data into/from the optical disk 1. The optical pickup part 140 serves as a part to record data by irradiating a laser beam spot along a track 2 of a rotating optical disk 1, then read a reflected light from the optical disk 100 obtained by irradiating the laser beam spot of the optical disk 1, and convert this reflected light to data. The data buffer 150 temporarily stores recorded and read-out data. The DFL information storage buffer 160 holds newest information of a defect list (abbreviated as DFL), being the information regarding a defect position and the alternate destination of the optical disk 1.

The system control part 110 is constituted of a micro processor, etc., in terms of a circuit, and operates in a state of being divided into functional blocks represented by a host control part 111, a mechanical control part 112, a logic recording/reproducing part 113, and a data cache part 114, depending on a program. The host control part 111 processes a command from the host control device. The mechanical control part 112 controls each kind of mechanism provided in the optical disk recording/reproducing device 100 such as the motor part 130 and the optical pickup part 140. The mechanical control part 112 makes the optical pickup of the optical pickup part 140 move (seek) to a target position, and controls recording processing or read-out processing of data into/from the optical disk 1. The logic recording/reproducing part 113 manages the information such as DFL stored in the DFL information storage buffer 160, and performs control such as converting a logical address (LSN), to which a recording request or a read-out request is given from the host control device, to an actual access object address (PSN) on the optical disk 1. The data cache part 114 manages recorded data and read-out data in the data buffer 150.

Here, explanation is briefly given for a management method of the information regarding the defect position and the alternate destination of the optical disk 1 using the DFL information storage buffer 160.

When the optical disk 1 is inserted into the optical disk recording/reproducing device 100, the system control part 110 controls the motor part 130, etc., to start the optical disk 1, controls to drive the optical pickup part 140, and reads-out disk management information such as the defect list (DFL) showing the present state of the optical disk 1 recorded in the optical disk 1. The disk management information of DFL read-out from the optical disk 1 is stored in the DFL information storage buffer 160.

Thereafter, recording processing or read-out processing is performed into/from the optical disk 1 which is started. At this time, the logic recording/reproducing part 113 performs processing by using DFL data, being the information of DFL stored in the DFL information storage buffer 160.

In the recording processing or the read-out processing, when a defective block is newly detected, the logic recording/reproducing part 113 creates the information regarding the defect position and the alternate processing, as an alternate entry. The data created as the alternate entry is registered in the DFL data managed in the DFL information storage buffer 160, and newest DFL data is created.

In the optical disk recording/reproducing device 100 of the embodiment 1, detection of the defective block refers to verifying processing (Verify) of the recording processing (Write & Verify) to verify whether or not correct recording can be performed, when tracking error is generated at the time of performing recording operation into a position (block) where recording is supposed to be performed, resulting in failure in recording, and which is the processing in a case of not correctly reading the recorded data. Namely, detection of the defective block means that when there is a failure in correct recording, in response to the recording request given to the block, being a recording object, this block is judged to be the defective block.

As described above, the newest DFL data regarding the optical disk 1 is stored in the DFL information storage buffer 160. When start of the optical disk 1 is stopped, at an arbitrary timing before the optical disk 1 is discharged from the optical disk recording/reproducing device 100, the system control part 110 controls the optical pickup part 140, so that the newest DFL data stored in the DFL information storage buffer 160 is recorded in a defect management area of the optical disk 1, as DFL. Thus, by controlling the optical pickup part 140 to record the newest DFL data in the defect management area of the optical disk 1, as DFL, the newest DFL data is reflected in the optical disk 1.

In the explanation given hereunder, for example, the meaning of registering the alternate entry in the DFL is the same as the meaning of registering (inserting) the alternate entry in the newest DFL data stored in the DFL information storage buffer 160.

(2) Sequential Defective Area Judgment Method

Next, explanation is given for a method of estimating and judging sequential defective areas in a case such as mixing-in of bubbles, by the optical disk recording/reproducing device 100.

When the recording processing fails with some degree of sequentiality and the recording processing fails in a plurality of blocks (=when the defective area is detected), it is possible to estimate and judge that there is a high possibility of sequential defects such as bubbles that exist in the sequential defective areas. Such an estimating judgment can be performed with further precision, by using further more (further extensive) recording processing results, namely the recording processing results obtained from further extensive range. Reversely, there is a high possibility of erroneous judgment, when there is less information regarding the recording processing, as a judgment material.

However, what is requested in the estimating judgment is to perform estimating judgment for the sequential defective areas immediately as much as possible. When time is taken in using the recording processing results for many areas, alternate recording must be performed frequently for the defective areas, and this makes it impossible to solve a problem of generating time-out as described above. Therefore, it is important to have a balance between increase in precision and speed in processing to estimate and judge the sequential defective areas.

Next, brief explanation will be given for the characteristics of an area in which bubbles are mixed, namely an area invaded by foreign matters.

As described above, the bubbles exist in a circle form, having a size of about 100 μm, namely extending across about 300 tracks. This poses a possibility that in the block that allows the bubbles to mix therein, a tracking servo can not function, resulting in a state impossible to read even physical address information such as ADIP/AUN embedded along the track at the time of manufacturing the disk. Further, in this optical disk 1, the next block can not be accessed in some cases. After all, defective blocks are allowed to sequentially exist periodically almost at the same position (namely the same position in a diameter direction) across a plurality of tracks. More specifically, such an optical disk 1 allows the defective blocks to exist for almost each turn of the track. Thus, in the optical disk having the area in which bubbles are mixed, the defective block exists periodically.

However, in the optical disk recording/reproducing device 100, as described above, when the block 3 of a certain address is accessed, generally synchronization with an access position is performed. More specifically, the optical pickup is allowed to move (seek) to the block, being an access object, directed to an address before several blocks (for example, before 1 to 2 blocks). Then, by utilizing a rotation of the optical disk 1, the optical pickup reaches the block of the address, being an object, while maintaining a tracking state along the track thereafter. Therefore, even if the block itself, being the access object, is not invaded by the bubbles, when the defective block allowing the bubbles to mix therein exists in the block before several blocks, the address can not be acquired, or a phenomenon of tracking error such as jumping (called abnormal jumping) to an unintentional area occurs. Therefore, the optical pickup can not reach (can not access) the block of the designated address, and as a result, the block, being the access object, is judged to be defective in many cases.

As described above, when the designated block is accessed, the seek is performed directed to the address before several blocks, and this is because there is a difference between a rotation speed of the optical disk, being the access object, and a moving speed of the optical pickup itself. When control is performed so that a target address is directly accessed, there is a problem that the target address is passed through, thus making it greatly difficult to perform control.

Accordingly, when the bubbles exist in the optical disk 1, in many cases, it is so judged that the defective blocks exist sequentially in the diameter direction of the optical disk 1, and also the defective blocks exist sequentially over several blocks in a circumferential direction.

In addition, in a case of the optical disk 1 having a defect management function, generally Write & Verify processing is adopted in recording data into the block. This processing is the processing of recording (writing) data in an object block, thereafter reading the data from this block, and verifying whether or not the data to be recorded correctly recorded.

For example, the defect due to adhesion of a finger print is affected by a degree of stain due to such a finger print. However, although recording in this block is generally performed correctly, the data can not be read correctly, resulting in being judged to be error in many cases at the time of verification. Meanwhile, when the address, being the object, shows the block having the bubbles mixed therein, even recording can not be performed for the reason that the address can not be acquired, resulting in being easily judged to be error in writing.

In addition, in a write-once media or stream recording, as the recording processing, not only the processing of Write & Verify, but also a method of performing only Write is also frequently adopted. In this case also, in the same way as the aforesaid case, although there is a high possibility of success when recording operation is performed into the block having finger prints adhered thereto, there is a high possibility of failure in a case of the bubbles.

Further, factors of a Write error are limited to some extent, in a case of a failure in recording into the block due to bubbles. Namely, the Write error in this case is caused by failure in acquiring the address or tracking error (abnormal jumping) as described above in many cases.

This is because each bubble is not a planar defect having a light shielding property but is a solid shaped defect having transparency. Namely, while simply a part of the light emitted to the track is attenuated by the fingerprint, an optical axis itself of the light is bent by the bubbles by its lens effect. As a result, mixing-in of the bubbles not only attenuates a tracking error signal but also distorts a tracking error signal randomly, thus, disturbing tracking control.

As described above, when the block becomes the defective block due to mixing-in of the bubbles in the optical disk 1, the following characteristics can be given.

(A) A case of failure in recording of Write or Write & Verify,
(B) A case of not acquiring address (NG in acquisition of address), or case of generating servo tracking abnormality represented by abnormal jumping, as factors of Write error,
(C) A case of existence of sequential defective blocks in a diameter direction, and
(D) A case of existence of sequential defective blocks in a circumferential direction.

Therefore, in consideration of the above-described characteristics, when the block becomes the defective block due to mixing-in of the bubbles, according to the embodiment 1, it is so estimated and judged that the bubbles exist in this optical disk 1, when the detected defective block satisfies any one of the conditions shown below.

Namely, when the defect is caused by Write error, and an error factor is NG in acquisition of address, or tracking error, and when conditions of the following i) or ii) are satisfied by the frontward block or backward block including this defective block or front and rear blocks, it is so estimated and judged that the bubbles exist in this optical disk 1. Here, the frontward of this block refers to a direction of an already traced block traced to an appropriate block in a direction of tracing the track of the optical disk by the optical pickup along with the rotation of the optical disk 1, and the backward of this block refers to a direction of the block not traced yet to the appropriate block.

i) A case of detecting N (N is integer of 1 or more) defective blocks sequentially in a diameter direction, and
ii) A case of detecting M (M is integer of 1 or more) defective blocks sequentially in a circumferential direction.

According to the embodiment 1 of the present invention, the integer of N and M is set at 3 respectively, and explanation will be given, for example in a case of sequentially detecting the defective blocks frontward, however, the present invention is not limited thereto.

Also, areas estimated to be the sequential defective areas due to mixing-in of the bubbles by the aforementioned estimating judgment method are abbreviated as sequential defect estimated areas hereunder.

By using the alternate entry registered in the DFL (defect list), judgment of sequentiality is performed under conditions of the above-described i) and ii). Namely, judgment is made whether or not the alternate entry exists, with the address of the block of one block before in the diameter direction or circumferential direction of the address of this defective block set as the alternate source. Explanation will be given hereunder, for example in a case of the sequential defective blocks frontward, on the assumption that sequential writing such as sequential recording is performed.

Note that the DFL is not used in judgment of the sequentiality, and it may also be preferable to use a method in which, for example, a case of the sequential recording is focused, and prescribed number of defective block information is held in the memory part 120, and by using only this information, sequentiality is verified.

In the embodiment 1, judgment whether or not the defect is caused by the Write error, or verification of the error factor is performed only for the defective block judged to be defective this time. Regarding the front and rear blocks for verifying the sequentiality, a method of not verifying its defect factor is used, on the assumption that the alternate entry of the DFL used for verifying the sequentiality does not include such information. However, for example, it is also preferable to use a method of performing judgment including the defect factor, for the front and rear blocks used in judgment of sequentiality, provided with defect factor information, etc., in the information used in judgment of the sequentiality. Alternatively, the defect factor information may be included in the alternate entry itself.

Here, brief explanation is given for the reason for setting N and M to be 3 respectively. These values are numerical values in consideration of not allowing the time-out to occur, which is an object of the present invention. Particularly, these values are numerical values defined not allowing time-out to occur in the host computer in which 7.5 seconds are required for time-out.

Further, M=3, which is a continuous number in the circumferential direction, is set in consideration of a seek processing of the optical disk recording/reproducing device. Namely, as described above, when a certain block is accessed, in order to synchronize with an access position, the seek processing is generally performed, with the address of 1 to 2 blocks before this block set as a target, and in this state, while maintaining the servo along the track, the target block is accessed. Therefore, even if the target block is influenced by mixing-in of the bubbles, not only the target block but also the subsequent block after 1 to 2 blocks has a high possibility of being judged to be defective, and this point is considered.

Also, N=3, which is the continuous number in the diameter direction, is the numerical value set in consideration of the number of tracks having a possibility of jumping actually when abnormal jumping is generated.

Note that the numerical value shown in the aforementioned judgment estimating method is shown as absolutely an example, and the present invention is not limited to this numerical value, provided that similar effects can be obtained.

Note that the method is not limited to the aforementioned method, as the method of judging the sequential defective areas. For example, when the bubbles exist in the inner circumferential side of the optical disk 1, basically almost all clusters are judged to be defective, because one track on the inner circumferential side is constituted of two blocks. In addition, when the bubbles exist on the outer circumferential side of the optical disk 1, several blocks of 5 blocks can be normally accessed, because one track on the outer circumferential side is constituted of 5 blocks, and there is also a case that two blocks in each track exist sequentially in the diameter direction as defects. Therefore, it is also effective to use a method of controlling the continuous number and combination of conditions in the above-described judgment method, according to the number of the blocks included in the track where the defective block exists.

As the other judgment method, it is also preferable to add to the judgment conditions, for example, the address obtained from the optical pickup part 140 and a state of each kind of signal such as reproduction data. Further, it is also preferable to use a method in which the optical disk 1 is irradiated with a specific beam different from recording/reading-out beam, and by determining a state of irregularities on the surface from the reflected light, the position where the bubbles exist is discovered in advance.

Note that regarding the aforementioned judgment method and judgment conditions, it is also possible that mixing-in of the bubbles is set as a target, and by changing these conditions, etc., it is possible to respond to the defects other than bubbles, extending across a wider range.

Also, regarding the aforementioned judgment method and judgment conditions, mixing-in of the bubbles is set as a target. However, according to the present invention, it is not only mixing-in of the bubbles that is set as the target to perform the processing. Namely, for example, even in a case that these conditions are satisfied by the defect such as a strong scratch other than mixing-in of the bubbles, this area is similarly treated as each sequential defect estimated area.

(3) Specification of the Sequential Defect Estimated Area

When it is so judged that the sequential defective areas exist by the aforementioned (2) sequential defective area judgment method, all blocks included in the areas (=sequential defect estimated areas) of prescribed number of tracks that subsequently exist, are collectively treated as the defective blocks, with the block (or the defective block, being a judgment reference) next to the defective block, being the judgment reference, set as a head. Then, recording requests into these sequential defect estimated areas are controlled so that all of them are alternately recorded into the alternate destinations.

The prescribed number of tracks according to the embodiment 1 of the present invention is calculated, with the number of tracks corresponding to 100 μm, being a size of the bubble (diameter) set as a reference, and 320 tracks are obtained. Note that the number of blocks included in one track is different depending on the position on the inner circumferential side and the outer circumferential side of the disk. Therefore, the total number of blocks included in the sequential defect estimated areas is also changed depending on the position where this area exists. According to the embodiment 1, the total number of blocks is obtained by multiplying the number of blocks included in the track where the head block of the sequential defect estimated areas exists, by 320, being the total number of tracks.

Note that according to the embodiment 1, explanation is given, with the size of the bubble set at 100 μm. However, the size of the area judged to be defective becomes about 300 μm in many cases, under an influence of mixing-in of the bubbles. This size may be used as the size of the bubble. Namely, the numerical values of 100 μm as the size of the bubble explained in the embodiment 1, and 320 tracks as the number of tracks influenced thereby, are absolutely given as examples. For example, the size of the bubble needs not to be set at 100 μm, and may be set at 300 μm. In addition, in the aforementioned sequential defective area judgment method, the area judged to be defective may be made changeable, in accordance with an estimated size detected by having a function of judging the size of each sequential defect estimated area in the aforementioned (2) sequential defective area judgment method.

Note that in the embodiment 1, explanation has been given for the method of obtaining the total number of blocks in the sequential defect estimated area by multiplying the number of blocks included in the track in which the head block of the sequential defect estimated areas exists, by the obtained total number of tracks. However, it may also be preferable to use a method of obtaining the total number of blocks of the sequential defect estimated areas by adding the number of defective blocks included in each track, or a method of obtaining the total number of blocks by multiplying the number of blocks included in a final track of the sequential defect estimated area by 320, being the total number of tracks.

Figure 2:
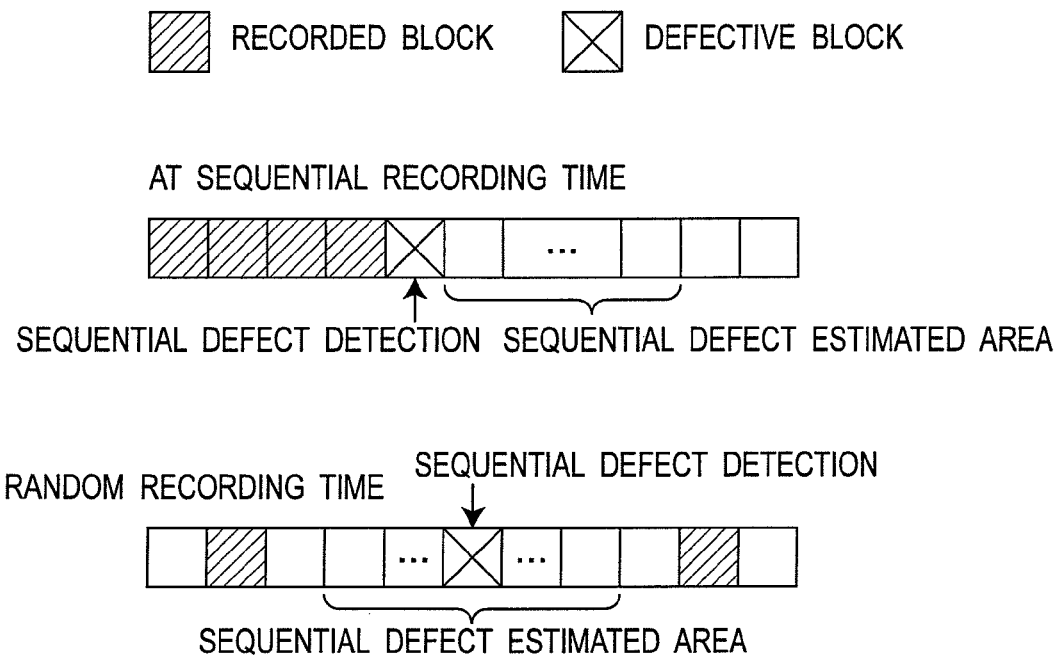
FIG. 2 is an explanatory view showing an example of a method of allocating sequential defect estimated areas in the optical disk recording/reproducing device according to the embodiment 1 of the present invention.

Note that in the aforementioned explanation, explanation is given for the method of setting a prescribed range subsequent to the block, being a judgment reference, as the sequential defect estimated area. However, the area regarded as the sequential defect estimated area needs not to be the block subsequent to the block set as the judgment reference. Namely, it is effective to use a method in which the block, being the judgment reference, is set as a reference, and prescribed ranges in the front and rear sides of this block are regarded as the sequential defect estimated areas. FIG. 2 is an explanatory view showing an example of a calculation method of the sequential defect estimated areas.

Specifically, in a case that the areas are judged to be the sequential defective areas by the aforementioned (2) sequential defective area judgment method during performing sequential recording processing, this case means that normal recording can be performed up to the block, being a judgment object. In this case, the area subsequent to the block, being the judgment reference, has a possibility of sequentially defective due to mixing-in of the bubbles, and as described above, the prescribed range subsequent to the block, being the judgment reference, may be regarded as the sequential defect estimated areas.

Meanwhile, when the areas are judged to be the sequential defective areas by the aforementioned (2) sequential defective area judgment method during performing random recording, unlike the case of the sequential recording, it is impossible to specify which area allows the normal recording to be performed. Therefore, the prescribed ranges in the front and rear of the block, being the judgment reference, are regarded as the sequential defect estimated areas, with this block set as a reference and this method is used. Thus, in a case of the random recording, the block, being the judgment reference, is set as a reference, and the prescribed ranges in the front and rear of this block may be regarded as the sequential defect estimated areas.

Note that another specifying method of the sequential defect estimated areas includes a method of inspecting whether or not the bubbles are mixed-in by actually performing tracking for the optical disk 1, and setting the size of the sequential defective areas by the portion of the size judged to be error in this inspection result.

Figure 3:
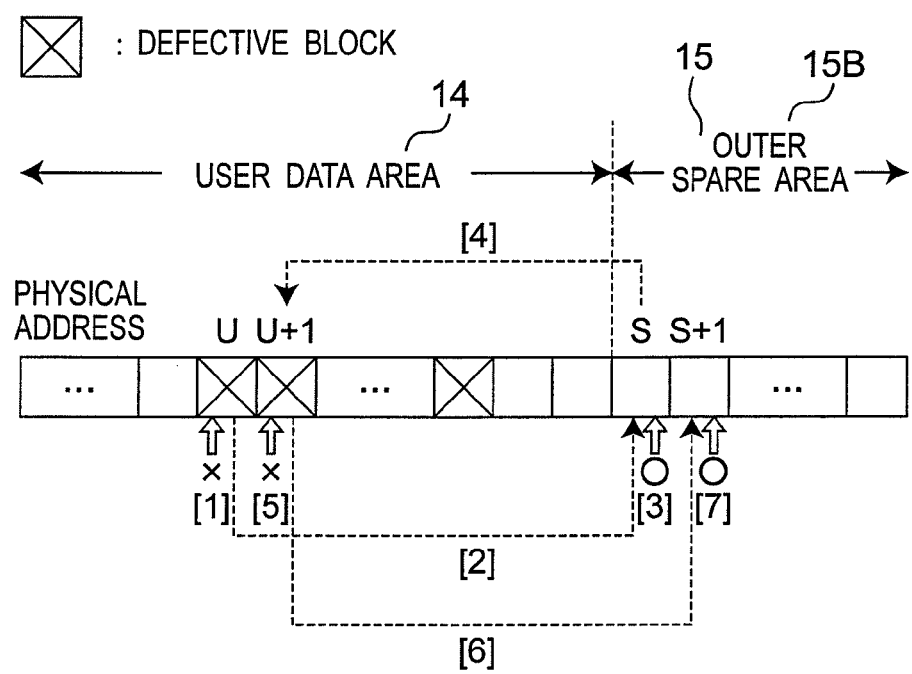
FIG. 3 is an explanatory view of a processing procedure of alternate recording in a conventional optical disk recording/reproducing device.
Figure 21:
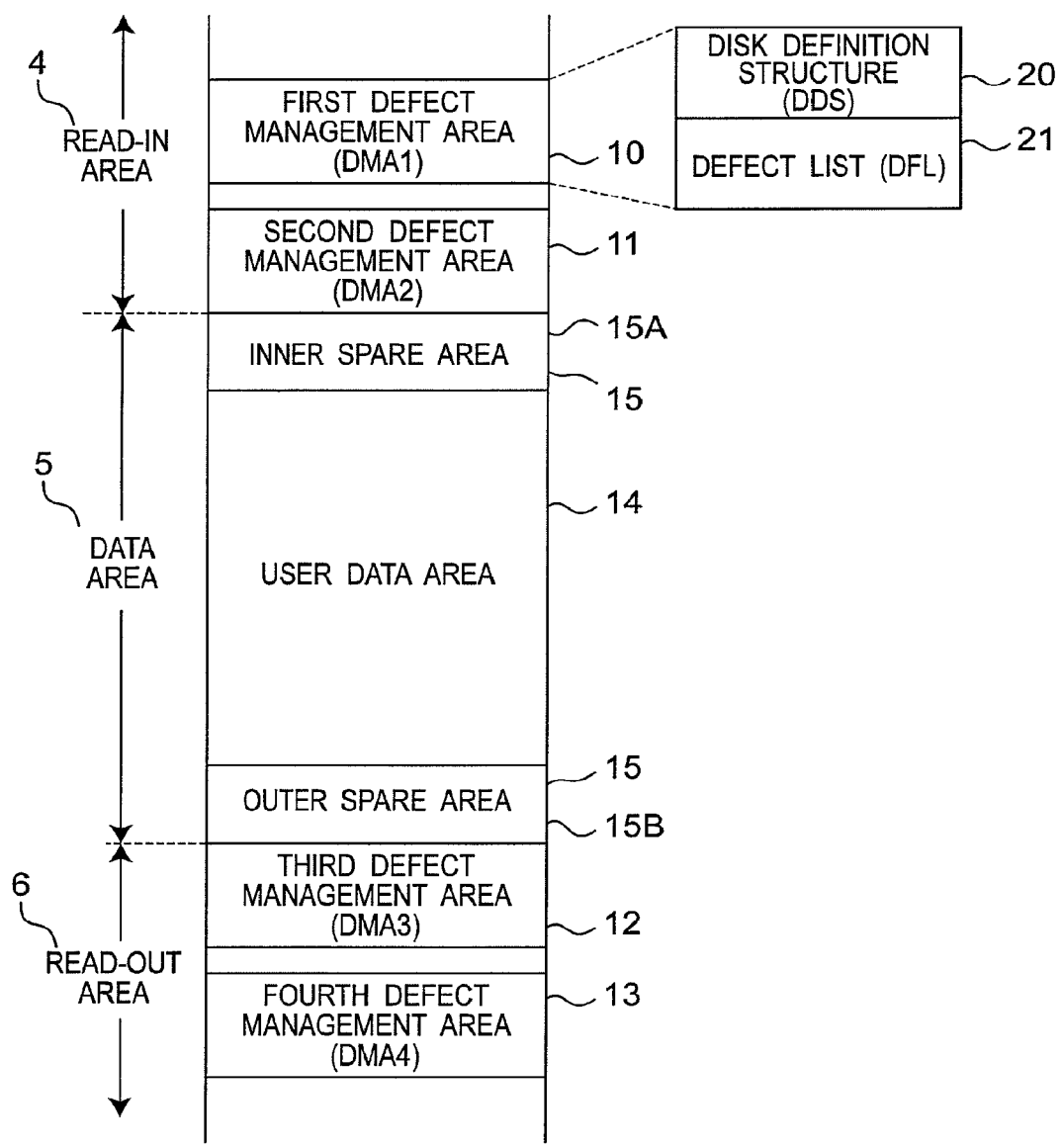
FIG. 21 is the explanatory view of the data structure of the general optical disk.
Figure 24:
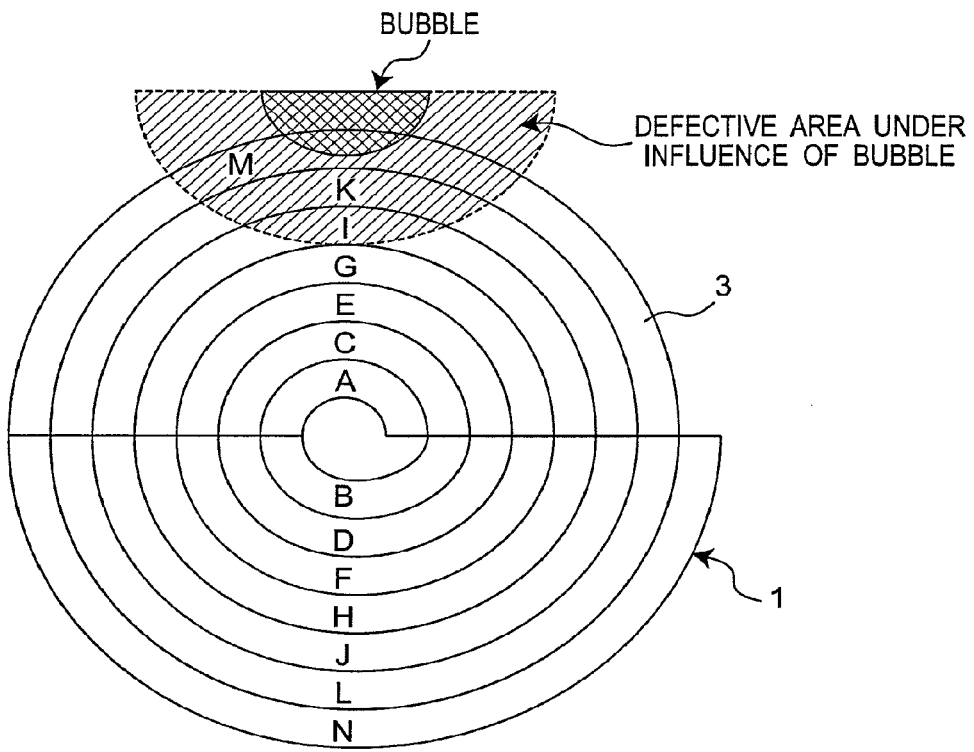
FIG. 24 is the schematic explanatory view regarding bubbles trapped in the optical disk.
Figure 25:
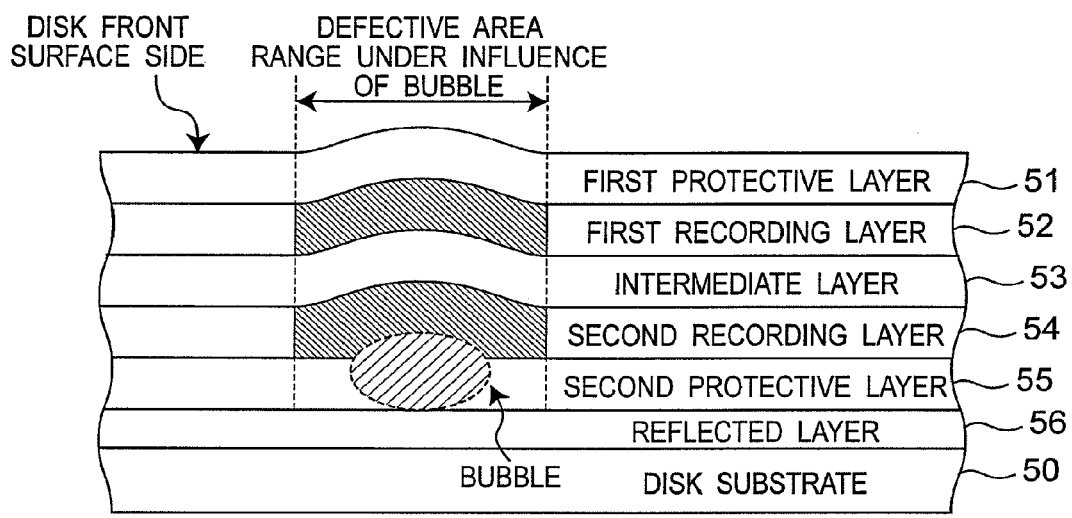
FIG. 25 is the schematic explanatory view regarding the bubbles which exist in the optical disk having a plurality of recording layers.

(4) Countermeasure at the Time of Detecting the Sequential Defect Estimated Areas FIG. 3 is a view simply explaining an operation procedure in a case of performing recording processing by a conventional technique, to the area where the defects are sequentially exist. Note that in FIG. 3, explanation is given, with PSN and LSN allocated in a block unit for simplifying the explanation, which are originally allocated in a sector unit. In addition, in the explanation given hereunder, a user data area 14 and a spare area 15 (an inner spare area 15A and an outer spare area 15B) explained in FIG. 21 are used.

In FIG. 3, block numbers shown by the physical address (PSN): the blocks of U and U+1 become the defective blocks under an influence of mixing-in of the bubbles. The spare area 15 (in FIG. 3, the outer spare area 15B) that can be used as the alternate destination of each of the defective blocks (U, U+1) shows the block number: S and S+1. Explanation will be given hereunder, for example in a case of performing alternate recording to each of them.

In FIG. 3, explanation is given, with numbers assigned to the operation procedure in a case of performing the recording processing sequentially to the sequential defective blocks (U, U+1).

(1) The block in the user data area 14: recording processing is performed to U, but fails.

(2) Block in the outer spare area 15B: S is allocated as the alternate destination, and optical pickup moves (seeks) for alternate recording.

(3) Block of the alternate destination: recording processing is performed to S (succeeds).

(4) Block in the user data area 14, being the next recording destination: the optical pickup moves to U+1.

(5) Block in the user data area 14: recording processing is performed to U+1 but fails.

(6) Block in the outer spare area 15B: S+1 are allocated as the alternate destination, and the optical pickup moves (seeks) for alternate recording.
(7) Block of the alternate destination: recording processing is performed to S+1 (succeeds).

By the above-described procedure, sequential recording processing regarding the sequential defective blocks (U, U+1) is performed.

Further, when the sequential defective blocks exist, the above-described processing is repeated. In this case, along with the alternate recording, as a result, optical pickup frequently moves (seeks) between recording positions of the user data area 14 and the spare area 15 (in this case, the outer spare area 15B), thus requiring tremendous processing time.

In order to prevent such a movement (seek) from being performed frequently, (2) in the estimating judgment method described in the sequential defective area judgment method, when it is so estimated that instead of this area, the sequential defective areas due to bubbles exist, the blocks in the spare area, being the area for replacing defects, are sequentially allocated (replaced) in advance as the alternate destinations. Then, regarding the recording request to the areas estimated to be the subsequently generated sequential defective areas, it is so controlled that these sequential defective areas are not accessed (recording processing is not performed), and the recording processing is entirely performed to the spare area 15 sequentially, which is the alternate recording destination. Under such a control, the processing time can be greatly reduced, compared to a case in which every time the defective block is detected, the alternate recording is performed from the user data area 14 to the spare area 15.

Meanwhile, in a case of rewritable media such as BD-RE, it is probable that the block exists in a range to which the alternate destination is allocated after the defect is estimated to be caused by bubbles, the block having already data because recording operation thereinto has succeeded before. Therefore, in the block where mixing-in of bubbles is estimated and the alternate destination is allocated, when the next recording request is given, recording processing is performed to the spare area 15 allocated as the alternate destination. However, when a reproducing request is given before the recording request is given, it must be so controlled that not the block of the alternate destination but the block of the alternate source is read-out.

Explanation will be specifically given for a method of allocating the spare area 15 for replacing defects instead of the sequential defective areas, while satisfying the above-described conditions.

A spare area allocating method as described below is given as an example of a method of allocating the spare area 15 as the alternate destinations of the sequential defective areas due to mixing-in of the bubbles.

1) The alternate entry is previously registered in the defect list (DFL) before executing actual recording.
2) Positional information of the sequential defective areas is previously stored in the memory part 120 (see FIG. 1), and regarding the recording request into this area, the address of the recording destination is intentionally converted to the address in the spare area 15.

Here, when a plurality of spare areas 15 allocated as the alternate destinations exist as shown in FIG. 21 (the inner spare area 15A and the outer spare area 15B), a method of deciding the spare area 15 allocated as the alternate destination will be explained.

As the method of deciding the spare area 15, it can be so considered that the spare area 15, to which sequential blocks can be allocated, is used as the alternate destination. Namely, as described above, it is a first priority matter that the blocks of the alternate destinations are sequentially allocated, so that the alternate destinations can be sequentially accessed.

However, the following case can be considered. Namely, the blocks of the alternate destinations of the sequential defect estimated areas can not be sequentially allocated to any one of the spare areas 15. In this case, there is a method of using the spare area 15, to which most sequential blocks can be allocated, as the block of the alternate destination, and allocating the spare area 15, to which the secondarily sequential block can be allocated, as the block of the alternate destination.

Based on the above-described consideration, various methods as described below can be given as a deciding method of the used spare area 15.

A method of using the spare area having a closest distance to the defective area in terms of address can be given as an example of a most general method. However, for example, when the number of usable blocks of the closest spare area is smaller than the number of blocks necessary for allocating, or when there are lots of defects in the spare area itself, in such a case, when sequential allocation to the spare area is difficult as the alternate destination, the spare area, to which the blocks can be sequentially allocated, is preferentially adopted as the alternate destination. Namely, specifically a spare area deciding method described below can be given as an example.

This is a method of deciding the spare area in best agreement with conditions as follows:
a) to select the spare area, to which the blocks can be sequentially allocated, is selected as the alternate destination of the sequential defective areas, and further
b1) to select the spare area having a closest address distance to the sequential defective area, and
c) to select the spare area having few defective blocks in the spare area itself.
Here, when there are lots of defects in the spare area itself, it is also preferable to use a method of not using this spare area as the alternate destination during detection of the mixing-in of the bubbles.

A case in which the bubbles exist in the spare area itself can be used as another deciding method of the used spare area 15. As one of the countermeasures against such a case, as described above, there is a method of not allocating the blocks to the spare area in which lots of defects exist, as the alternate destination.

When the bubbles exist in the spare area itself, it can also be so considered that the spare area is influenced by the bubbles detected in the user data area 14. Therefore, as another countermeasure, for example, when the bubbles detected in the user data area 14 exist on the outer circumferential side of the disk, the inner spare area 15A is used as the alternate destination. Meanwhile, when the bubbles detected in the user data area 14 exist on the inner circumferential side of the disk, the outer spare area 15B is used as the alternate destination. Thus, this is a countermeasure to allocate the spare area that exists on the opposite side to the position where the sequential defective areas are detected, as the alternate destination. Namely, this is a method of deciding the spare area in best agreement with conditions same as the aforementioned conditions a) and c), and in addition under the condition of:
b2) selecting the spare area having a far address distance to the sequential defective area,
and the spare area in best agreement with these conditions, is decided as the spare area of the alternate destination.

Further, as shown in FIG. 23, in a case of media including a plurality of recording layers (52, 54) such as two-layer media, the recording layer, where the bubbles exist, is most influenced by mixing-in of the bubbles. Therefore, it is effective to use a method of preferentially allocating the spare area that exists in another layer different from the layer where the sequential defective area is detected, as the alternate destination. Namely, this is a method under the same conditions as the aforementioned a) and c), and in addition under the condition of:

b3) selecting the spare area that exists in another layer different from the layer where the sequential defective areas are detected, and the spare area in best agreement with these conditions is decided as the spare area of the alternate destination.

Note that regarding the embodiment 1 of the present invention, explanation will be given hereunder by using the countermeasure to allocate the spare area in best agreement with conditions of a), b1), and c) explained first, as the alternate destination.

However, the deciding method of the allocated spare area is not necessarily the method as described above. Specifically, for example, it is also possible to use the countermeasure to allocate the spare area having a smallest physical address, as the alternate destination in the spare area satisfying the condition a) of the spare area deciding method.

Detailed explanation will be given hereunder, regarding each countermeasure under the conditions of 1) and 2) in the aforementioned spare area allocating method.

Countermeasure Using (4-1) Defect List (DFL)

This countermeasure is an effective method in the rewritable media such as BD-RE. Simply speaking, according to this countermeasure, when the sequential defective areas, in which the bubbles are mixed-in, are detected by the method shown in the aforementioned (2) sequential defective area judgment method, the sequential defective areas are registered in the DFL as the alternate entry, so that the block in the spare area is allocated at that time to the block in the sequential defect estimated areas, as the block of the alternate recording destination. Namely, newest DFL data in the DFL information storage buffer 160 shown in FIG. 1 is updated.

First, the alternate entry included in the DFL is simply explained.

FIG. 4 is a view showing an example of the kind of the alternate entry registered in the defect list (DFL) in BD-RE, being the rewritable optical disk, and in BD-R, being the write-once optical disk.

(1) of FIG. 4 is an explanatory view showing the structure of the alternate entry. As shown in (1) of FIG. 4, the alternate entry is constituted of the information of 8 bytes, including entry attribute 30 (4 bits), first alternate information 31 (28 bits) showing a head physical address of the alternate source, sub-attribute 32 (4 bits), being collateral information of the entry attribute 30, and second alternate information 33 (28 bits) showing the head physical address of the alternate destination.

(2) of FIG. 4 shows the kind of the alternate entry of BD-RE, being the rewritable optical disk. Attributes such as RAD, NRD, PBA, UNUSE, exist in the alternate entry of BD-RE, as the entry attribute 30.

The RAD attribute is the attribute showing the alternate of a single block, and includes the head physical address (alternate source PSN) of the block of the alternate source as the first alternate information 31, and the head physical address (alternate destination PSN) of the block of the alternate destination as the second alternate information 33. RAD0 and RAD1 exist in the RAD attribute. RAD0 shows that the block of the alternate source shown by the first alternate information 31 is actually alternately recorded in the block of the alternate destination shown by the second alternate information 33. In RAD1, the block of the alternate destination shown by the second alternate information 33 is allocated for the block of the alternate source shown by the first alternate information 31. However, RAD1 shows that actually the block of the alternate source shown by the first alternate information 31 is not alternately recorded in the block shown by the second alternate information 33. Namely, the block shown by the second alternate information 33 shown in RAD1 has not been used yet.

The NRD attribute is the entry showing a single defective block which has not been alternately recorded, and includes only the head physical address (defective PSN) of the defective block, as the first alternate information 31.

The PBA attribute is the entry showing the area of one block or more having possibility of defects, and includes the head physical address (defective PSN) as the first alternate information 31, and the number of sequential blocks as the second alternate information 33.

The UNUSE attribute is the attribute showing a single defective block in the spare area used as the alternate destination, and includes only the head physical address (defective PSN) of the defective block as the second alternate information 33.

(3) of FIG. 4 shows the kind of the alternate entry of the BD-R, being the write-once optical disk.

The attributes such as RAD, CRD, NRD exist in the alternate entry of the BD-R, as the entry attribute 30.

The same thing can be said for the RAD attribute and the NRD attribute, as the aforementioned case of BD-RE. In a case of the BD-R, being the write-once optical disk, either one of the alternate source block and the alternate destination block can be recorded only once, and can not be overwritten and reused. Therefore, the RAD attribute and RAD0 attribute are synonymous terms, and RAD1 attribute does not exist.

The CRD attribute is the entry showing alternate of two sequential blocks or more, and includes the head physical address (alternate source PSN) of the block of the alternate source as the first alternate information 31, and the head physical address (alternate destination PSN) of the block of the alternate destination as the second alternate information 33. The CRD attribute includes CRD (0001) showing a start position of the sequential blocks and CRD (0010) showing an end position, and is discriminated by sub-attribute 32. The CRD showing the start position and the CRD showing the end position always exist in pairs.

FIG. 5 is a view of the alternate entry showing a specific example of the CRD attribute of the entry attribute. When the alternate entry of the CRD attribute as shown in (1) of FIG. 5 exists, as shown in (2) of FIG. 5, alternate recording is performed where sequential blocks a to c are alternately recorded to the position of sequential blocks b to d.

Note that in the explanation given hereunder, the head physical address of the alternate source block is abbreviated as alternate source PSN, and the head physical address of the alternate destination block is abbreviated as alternate destination PSN, respectively.

Here, simple explanation will be given for a method of access information calculation processing performed by the logic recording/reproducing part 113 of the system control part 110 in the optical disk recording/reproducing device 100 of the embodiment 1. The access information calculation processing includes address conversion processing for converting a designated logical address (LSN) to a corresponding actual access physical address (actual access PSN) using the disk management information such as defects included in the DFL (defect list) and alternate information, and sequential accessible number calculation processing for calculating sequential accessible numbers, being the numbers of blocks that can be allowed sequentially recorded/read-out processing subsequent to the actual access PSN.

First, the address conversion processing in the access information calculation processing will be explained.

In this optical disk recording/reproducing device, when offset PSN, being the PSN in a normal state corresponding to the LSN whose access request is given from the host control device, is registered as the alternate source PSN in the alternate entry of DFL, the actual access PSN, being an actual access destination, is calculated according to the entry attribute 30 of the alternate entry in which the alternate source PSN is registered by the logical recording/reproducing part 113. Specifically, when the block of the alternate destination is allocated, namely in a case of RAD0 attribute and CRD attribute, the address registered as the alternate destination PSN of the alternate entry is calculated as the actual access PSN. Meanwhile, in a case of the alternate attribute in which the alternate destinations such as the NRD attribute and the PBA attribute are not allocated, the alternate source PSN is calculated as it is, as the actual access PSN.

However, only RAD1 attribute defined in BD-RE is slightly differently treated, compared to other attributes. Similarly to RAD0 attribute, the block of the alternate destination is allocated to the RAD1 attribute. However, alternate recording is not actually performed. Namely, when the offset PSN and the alternate source PSN of RAD1 attribute coincides with each other, the alternate destination PSN allocated similarly to RAD0 attribute, etc., is calculated as the actual access PSN, in a case of address conversion for recording processing. However, in a case of the read-out request, similarly to the NRD attribute, etc., the alternate source PSN is calculated as it is, as the actual access PSN. Note that when alternate recording is actually performed to the block shown by the alternate destination PSN of RAD1 attribute, the entry attribute is changed from RAD1 attribute to RAD0 attribute.

Note that the UNUSE attribute defined in BD-RE is the attribute showing the defective block in the alternate destination, namely in the spare area 15, and the offset PSN can not coincide with the address registered in the UNUSE attribute.

Next, the sequential accessible number calculation processing will be explained by using FIG. 6 to FIG. 11. Note that in FIG. 6 to FIG. 11, the PSN (physical address) and the LSN (logical address) originally allocated in a sector unit will be explained, in a state of being allocated in a block unit, for simplifying the explanation.

Figure 6:
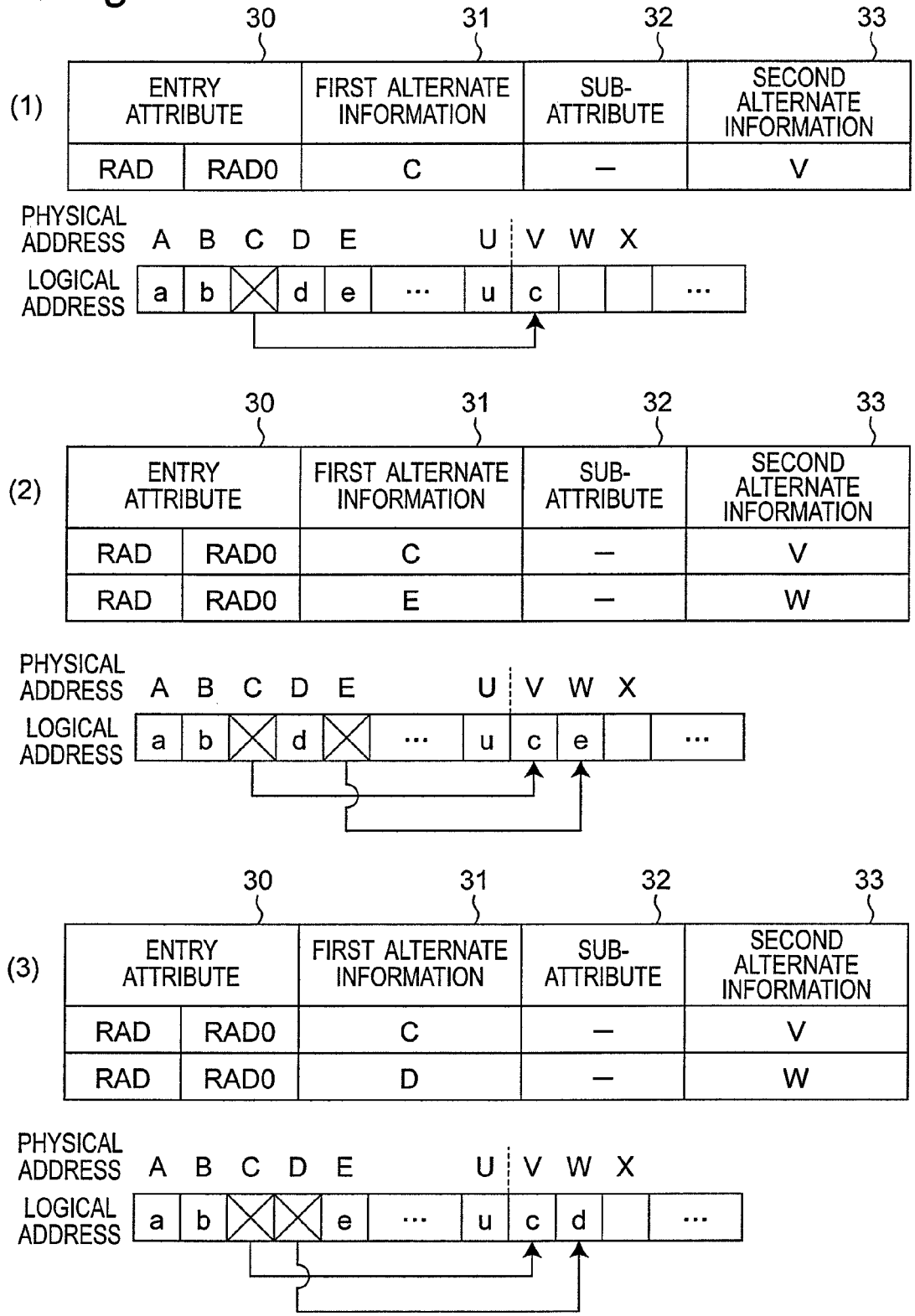
FIG. 6 is an explanatory view of calculation of the sequential accessible number, for RAD0 attribute in the optical disk recording/reproducing device according to the embodiment 1 of the present invention.

FIG. 6 shows a case in which RAD0 attribute exists in the entry attribute 30 of BD-RE.

(1) of FIG. 6 shows a case in which the blocks of PSN:C are alternately recorded in the blocks of PSN:V. In this case, the numbers of blocks that can be sequentially recorded/read into/from PSN:A correspond to two blocks (corresponding to PSN:A, B), because the blocks of PSN:C are alternately recorded. Then, the number of blocks that can be sequentially recorded/read into/from PSN:C, into which the blocks are alternately recorded, corresponds to one block (corresponding to PSN:V), and no alternately recorded blocks exist from PSN:D. Therefore, the number of blocks up to block U are calculated as the number of blocks that can be sequentially recorded/read.

(2) of FIG. 6 shows a case that the blocks of PSN:E are further alternately recorded in the blocks of PSN:W, in addition to a state shown in (1) of FIG. 6. In this case, similarly to the case of (1) of FIG. 6, the numbers of blocks that can be sequentially recorded/read into/from PSN:A correspond to two blocks (corresponding to PSN:A, B), and the number of blocks that can be sequentially recorded/read into/from PSN:C corresponds to one block (corresponding to PSN:V). Also, the number of the blocks that can be sequentially recorded/read into/from PSN:D corresponds to one block (corresponding to PSN:D), because the block of the PSN:E is alternately recorded, and the number of the blocks that can be sequentially recorded and read into/from the PSN:E corresponds to one block (corresponding to PSN:W).

(3) of FIG. 6 shows a case in which the blocks of PSN:D are further alternately recorded in the blocks of the PSN:W, in addition to a state shown in (1) of FIG. 6. In this case, similarly to the case of (1) of FIG. 6, the number of blocks that can be sequentially recorded/read into/from PSN:A correspond to two blocks. The blocks of PSN:C, D, being the sequential blocks, are alternately recorded in the blocks of PSN:V, W, being the sequential blocks respectively, and therefore the number of blocks that can be sequentially recorded/read into/from PSN:C are calculated as two blocks (corresponding to PSN:V, W). The numbers of blocks that can be sequentially recorded/read into/from the PSN:E correspond to the number of blocks up to block U.

As described above, in the sequential accessible numbers calculation processing, when the sequential alternate source blocks are alternately recorded in the sequential alternate destination blocks, the numbers of blocks that can be sequentially recorded/read are calculated. Thus, access performance for accessing the alternate destination can be improved.

FIG. 7 shows a case in which the NRD attribute exits as an example of the sequential accessible numbers calculation processing performed to the NRD attribute or the PBA attribute.

(1) of FIG. 7 shows a case in which the blocks of PSN:C are the defective blocks and are not alternately recorded and the alternate destinations are not allocated. The following two methods are given as examples of the calculation method of the sequentially recordable/readable numbers of blocks.

1) Alternate recording is not performed, and therefore the defective block needs not to be taken notice of, and can be so judged that these blocks can be sequentially accessed as they are, and the sequentially recordable/readable numbers of blocks are calculated.

2) Since the defective blocks exist, it is so judged that these defective blocks can be independently accessed sequentially, and the sequentially recordable/readable numbers of blocks are calculated.

The calculation method of the aforementioned 1) has a possibility of failures in recording/reading operation into/from the defective blocks. However, in a case of failure, the processing stops once at this block, and therefore the defect as a sequential access possible size is not taken into consideration, to perform calculation. When this calculation method is used, the sequentially recordable/readable numbers of blocks from PSN:A correspond to the number of blocks up to block U.

Meanwhile, according to the calculation method of the aforementioned 2), there is a high possibility that the recording/reading operation into/from the defective blocks results in failure. Therefore it is so considered that the access to the defective blocks and the access to normal blocks are not made sequentially. Accordingly, when the method of 2) is used, calculation is performed with the sequentially recordable/readable numbers of blocks from PSN:A set at two blocks (corresponding to PSN:A, B), and the sequentially recordable/readable number of blocks from PSN: C set at one block (corresponding to PSN:C), and the sequentially recordable/readable numbers of blocks from PSN:D set at the numbers of blocks up to block U.

(2) of FIG. 7 shows a case in which although the blocks of PSN:D are further the defective blocks, the alternate recording is not performed, and the alternate destinations are not allocated, in addition to a state shown in (1) of FIG. 7.

In a state shown in (2) of FIG. 7, similarly to the state shown in (1) of FIG. 7, when the calculation method of the aforementioned 1) is used, the sequentially recordable/readable numbers of blocks from PSN:A correspond to the numbers of blocks up to block U.

Meanwhile, when the calculation method of the aforementioned 2) is used, it is so considered that even if the defective blocks are sequential, there is a high possibility that both of them fail in recording/reading operation, and therefore each defective block is independently accessed. Accordingly, when the calculation method of 2) is used, calculation is performed, with the sequentially recordable/readable numbers of blocks into/from PSN:A set at two blocks (corresponding to PSN:A, B), the sequentially recordable/readable number of blocks into/from PSN:C set at one block (corresponding to PSN:C), the sequentially recordable/readable number of blocks into/from PSN:D also set at one block (corresponding to PSN:D), and the sequentially recordable/readable numbers of blocks set as the numbers of blocks up to block U.

FIG. 8 shows a case in which RAD1 attribute exits in the entry attribute of BD-RE. The sequential accessible numbers calculation processing applied to RAD1 is the same as that of RAD0 attribute for recording processing, and is the same as that of NRD/PBA attribute for reading processing, and a control method (calculated actual access PSN) is changed in the recording processing and in the reading processing.

(1) of FIG. 8 shows a case in which although the blocks of PSN:V are allocated as the blocks of the alternate destinations of the blocks of PSN:C, the alternate recording is not performed yet.

In a case of a state shown in (1) of FIG. 8, the blocks of PSN:V are allocated as the alternate recoding destinations of the blocks of PSN:C, and therefore the sequentially recordable numbers of blocks correspond to two blocks (corresponding to PSN:A, B). Then, calculation is performed, with the sequentially recordable number of blocks from PSN:C, to which the block of the alternate destination is allocated, set at one block (corresponding to PSN: V), and the sequentially recordable numbers of blocks set at the numbers of blocks up to block U, because no alternately recorded block exists after PSN:D.

Meanwhile, since the blocks of PSN:C are not alternately recorded, the sequentially readable numbers of blocks are the same as the aforementioned case of NRD-PBA attribute. Accordingly, when the aforementioned calculation method of 1) is used, the sequentially readable numbers of blocks from PSN:A correspond to the numbers of blocks up to block U. When the aforementioned calculation method of 2) is used, calculation is performed, with the sequentially readable numbers of blocks from PSN:A set at two blocks (corresponding to PSN:A, B), the sequentially reading possible number of blocks from PSN:C set at one block (corresponding to PSN:C), and the sequential readable numbers of blocks set at the numbers of blocks up to block U from PSN:D.

(2) of FIG. 8 shows a case in which although the blocks of PSN:V are allocated as the blocks of the alternate destinations of the blocks of PSN:C, the alternate recording is not performed yet, and further although the blocks of PSN:W are allocated as the blocks of the alternate destinations of the blocks of PSN:D, the alternate recording is not performed yet.

In a case of a state shown in (2) of FIG. 8, since the blocks of PSN:V, W are allocated as the alternate recording destinations of the blocks of PSN:C, D, the sequentially recordable numbers of blocks correspond to two blocks from PSN:A (corresponding to PSN:A, B). Further, since the blocks of PSN:V, W, being the sequentially blocks respectively, are allocated as the alternate recording destinations, calculation is performed, with the sequential recordable numbers of blocks from PSN:C set at two blocks (corresponding to PSN: V, W). The sequentially recordable numbers of blocks from PSN:E correspond to the numbers of blocks up to block U.

Meanwhile, since the blocks of PSN:C, D are not alternately recorded, the sequentially readable numbers of blocks are the same as the aforementioned case of NRD-PBA attribute. When the aforementioned calculation method of 1) is used, the sequentially readable numbers of blocks from PSN:A correspond to the numbers of blocks up to block U. When the aforementioned calculation method of 2) is used, calculation is performed, with the sequentially readable numbers of blocks from PSN:A set at two blocks (corresponding to PSN:A, B), the sequentially readable number of blocks from PSN:C set at one block (corresponding to PSN:C), the sequentially readable number of blocks from PSN:D also set at one block (corresponding to PSN:D), and the sequentially readable numbers of blocks set as the numbers of blocks from PSN:E to block U.

Also, explanation will be briefly given for the sequentially accessible numbers calculation processing in BD-R, being the write-once optical disk.

FIG. 9 shows a case in which CRD attribute exists in BD-R. In this example, the blocks from PSN:B to PSN:D are sequential, and are alternately recorded in the blocks from PSN:V to PSN:X.

Figure 10:
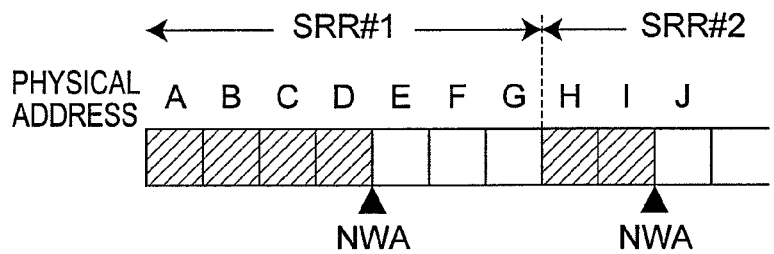
FIG. 10 is an explanatory view of a BD-R area structure, being the write-once optical disk.

An area structure of BD-R will be simply explained here. FIG. 10 is a view showing the area structure of BD-R, being the write-once optical disk. In a case of the write-once media such as BD-R, it is divided into a recording range called SRR (Sequential Recording Range), and write-once recording is performed in this recording range. Next writable start position is an unrecorded head position shown by NWA (Next Writable Address). Specifically, in a case of FIG. 10, NWA of SRR#1 is a block head of PSN:E, and NWA of SRR#2 is a block head of PSN: I. Since this is the write-once media, the sequentially recordable numbers of blocks correspond to the number of unrecorded blocks from NWA position to SRR end thereof. In SRR#1, correspond to the number of blocks from the blocks of PSN:E to the blocks of PSN:G in a case of FIG. 10. Also, this is the write-once media, no recorded block exists within SRR, after NWA, being the recording start position. Therefore, of course no corresponding block is registered in the defect list (DFL). Also, no sequentially recordable numbers of blocks are affected by contents of the DFL, like BD-RE, being the write-once media.

Note that a function called a pseudo OW (Over Write) is also prepared in BD-R. This pseudo OW has a mechanism of making it logically possible to overwrite on a recorded area in the write-once media in which overwriting is possible only from a position originally shown by NWA. More specifically, when a re-recording request is given to the recorded area, the alternate entry is registered in the DFL, with its block set as the alternate source (first alternate information 31), and a position shown by NWA set as the alternate destination (second alternate information 33), to perform alternate recording to the position shown by NWA. By performing processing in this way, the block of the alternate destination shown by the alternate entry is read-out at the time of reading. Therefore, virtually it appears that overwriting is performed. However, in this case also, the sequentially recordable numbers of blocks are the same as those in a case of write-once operation from the NWA position.

Meanwhile, the sequentially readable numbers of blocks are calculated, with the recorded blocks in SRR set as the number of blocks that can be read-out. Namely, in a case of an example shown in FIG. 9, the sequentially readable number of blocks from PSN:A correspond to one block (corresponding to PSN:A). Since the blocks from PSN:B to D are sequentially alternated to the blocks from PSN:V to X. Therefore, calculation is performed, with the sequentially readable numbers of blocks from PSN:B set at three blocks (corresponding to PSN:V, W, X), and the sequentially readable of blocks from PSN:E set at one block (corresponding to PSN:E). In addition, the block after PSN:F is unrecorded, and therefore calculation is performed, with the number of blocks set at 0, when calculation of the sequential readable numbers of blocks from PSN:F is requested.

Figure 11:
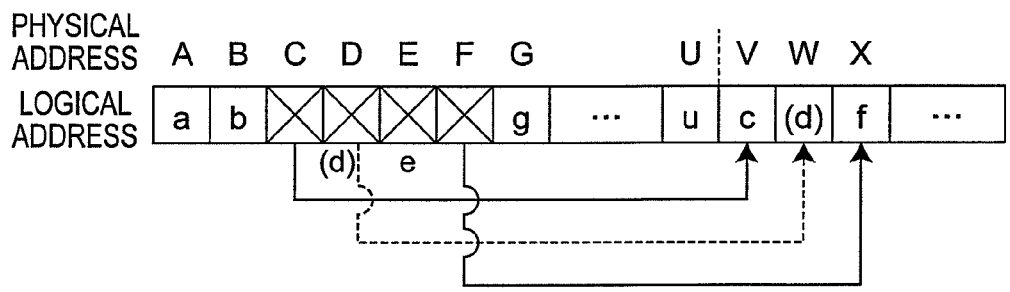
FIG. 11 is an explanatory view of calculation processing of the sequential accessible number in the optical disk recording/reproducing device according to the embodiment 1 of the present invention.

FIG. 11 shows an example of a mixed case of RAD0, RAD1, and NRD, in BD-RE, being the write-once optical disk. This case can also be coped with, from the point of view same as the point of view of the calculation processing of the sequentially recordable/readable numbers of blocks in each aforementioned attribute.

FIG. 11 shows a case in which the blocks of PSN:C, F are alternately recorded in the blocks of PSN:V, X, respectively, and further the blocks of PSN:W are allocated as the alternate recording destinations of the blocks of PSN:D, and further although the blocks of PSN:E are the defective blocks, alternate recording is not performed, and the alternate destinations are not allocated, either.

In a case shown in FIG. 11, there is a difference that the blocks of PSN:C are already alternately recorded in the blocks of PSN:V, being the alternate destinations, the blocks of PSN:D are not alternately recorded yet. However, sequential blocks of PSN:V, W are allocated respectively as the blocks of the alternate destinations of sequential PSN:C, D, which are then recorded in the sequential blocks. Accordingly, the sequentially recordable numbers of blocks are set, so that the sequentially recordable numbers of blocks from PSN:A correspond to two blocks (corresponding to PSN:A, B), and the sequentially recording numbers of blocks from PSN:C also correspond to two blocks (corresponding to PSN:V, W). The sequentially recordable number of blocks from PSN:E corresponds to one block (corresponding to PSN:E), since PSN:F is already recorded into blocks of PSN:X, the sequentially recordable number of blocks from PSN:F corresponds to one block (corresponding to PSN:X), and the sequentially recordable numbers of blocks from PSN:G correspond to the numbers of blocks up to PSN:U.

Meanwhile, the sequentially readable numbers of blocks of PSN:C,F are alternately recorded in the blocks of PSN:V, X, respectively. Therefore, the reading destinations are the blocks of PSN:V, X. In addition, the blocks of PSN:D have the alternate destinations allocated thereto, but are not alternately recorded in these alternate destinations, and therefore the reading destinations remain to be the blocks of PSN:D.

Namely, when the aforementioned calculation method of 1) is used, calculation is performed, with the sequentially readable numbers of blocks set at two blocks from PSN:A (corresponding to PSN:A, B), one block from PSN:C (corresponding to PSN:V), two blocks from PSN:D (corresponding to PSN:D, E), one block from PSN:F (corresponding to PSN:X), and the sequentially readable numbers of blocks set as the numbers of blocks from PSN:G to PSN:U.

Meanwhile, when the aforementioned calculation method of 2) is used, calculation is performed, with the sequentially readable numbers of blocks set at two blocks from PSN:A (corresponding to PSN:A, B), one block from PSN:C (corresponding to PSN:V), one block from PSN:D (corresponding to PSN:D), also one block from PSN:E (corresponding to PSN:E), also one block from PSN:F (corresponding to PSN:X), and the sequentially readable numbers of blocks set as the numbers of blocks from PSN:G to PSN:U.

Note that according to the embodiment 1 of the present invention, explanation has been given, with the accessible numbers calculated by the numbers of blocks. However, even if using other unit such as calculating in a sector unit, similar effects as the aforementioned embodiment 1 can be obtained, and the accessible numbers according to the present invention is not limited to a block unit.

Access information calculation processing is different for each entry attribute 30 in the alternate entry, and this characteristic is utilized in the calculation method of the aforementioned sequentially recordable/readable numbers of blocks. When the area is judged to be the defective area by the aforementioned (2) sequential area judgment method, in the recording processing performed to a certain block, the blocks included in the areas (=sequential defect estimated areas) of prescribed numbers of tracks that exist after these blocks are collectively treated as the defective blocks. Then, the blocks included in this sequential defect estimated areas are collectively registered in the DFL, as the alternate entry of RAD1 attribute, with the block included in this sequential defect estimated areas set as the alternate source (first alternate information 31), and the block of the spare area, being the area for alternate recording, set as the alternate destination (second alternate information 33).

Figure 12:
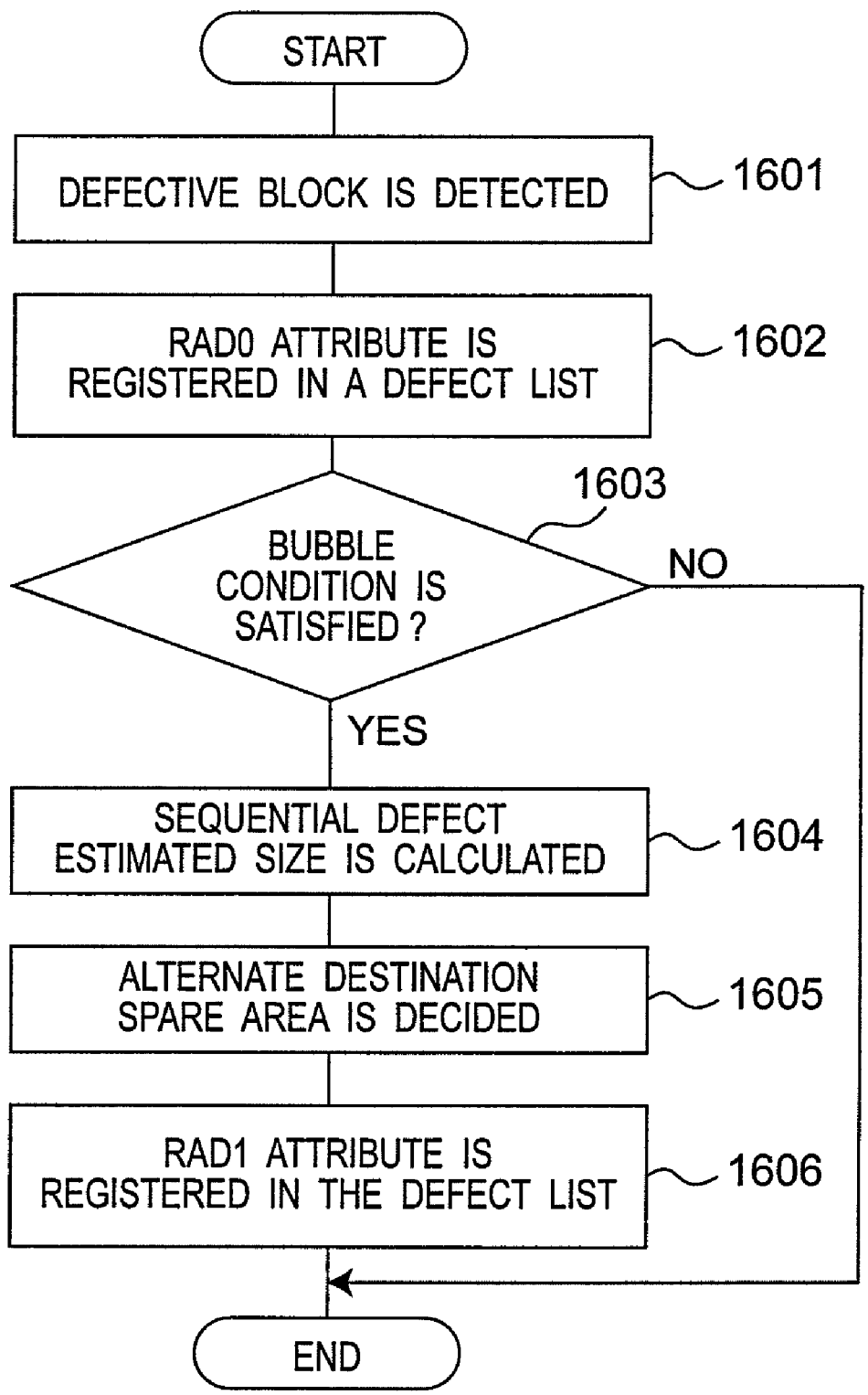
FIG. 12 is a flowchart showing processing operation at the time of detecting the sequential defect estimated areas using a defect list, in the optical disk recording/reproducing device according to the embodiment 1 of the present invention.

FIG. 12 is a flowchart showing the operation for detecting the sequential defect estimated areas.

Step 1601: the defective block is detected during recording processing.

Step 1602: the block in the spare area is allocated as the block for alternate recording of the defective block detected in step 1601, and is registered as the alternate entry of RAD0 attribute showing execution of alternate recording. Here, there is no problem in using RAD1 attribute in the attribute used in registering. However, when the RAD1 attribute is used, preferably processing of changing the attribute to RAD0 attribute is performed, after executing alternate recording of the defective block detected in step 1601, which is executed after step 1606 as will be described later.

Step 1603: whether or not the defective block detected in step 1601 satisfies a bubble judgment condition of the sequential defect estimated areas, is judged.

Step 1604: when it is so judged that this defective block satisfies the bubble judgment condition, the size of each sequential defect estimated area is calculated. Specifically, this size is calculated by a method explained in the aforementioned (3) specification of the sequential defect estimated areas. For example, by multiplying the number of blocks included in a track where the defective block detected in step 1601 exists, by the number of tracks corresponding to the sequential defect estimated areas (in this example, 320), the size of the sequential defect estimated area is calculated.

Step 1605: the spare area allocated as the alternate destinations of the sequential defect estimated areas and the block of each alternate destination are decided. Specifically, they are decided by the method explained in the recording/reading processing performed at the time of the aforementioned (4) detection of the sequential defect estimated areas. For example, the spare area in best agreement with the conditions such as:

a) selecting the spare area to which the block can be sequentially allocated, as the alternate destinations of the sequential defective areas,
b1) selecting the spare area having a distance close to the sequential defective area, and
c) selecting the spare area having few defective blocks in the spare are itself,
is allocated as the spare area of the alternate destination, and is set as the block of the alternate destination.

Step 1606: the alternate entry is registered in the defect list, with the block in the sequential defect estimated area set as the alternate source (first alternate information 31), and the block in the spare area obtained in step 1605 set as the alternate destination (second alternate information 33). This registering processing is repeatedly performed by the number of blocks included in the sequential defect estimated areas. At this time, RAD1 attribute is registered, so that the block of the alternate source and the block of the alternate destination in the RAD1 attribute are made sequential respectively.

Note that when the alternate entry is already registered in the DFL, with the blocks in the sequential defect estimated areas set as the alternate source/defective blocks, the RAD1 attribute corresponding to these blocks is not registered. Specifically, when the already registered alternate entry is the alternate entry of RAD0 attribute and RAD1 attribute, nothing is performed, and when this is the alternate entry of NRD attribute and PBA attribute, preferably the entry attribute is changed to RAD1 attribute and the changed attribute is re-registered.

As described above, the operation procedure is performed at the time of detecting the sequential defect estimated areas. Thereafter, recording into the block of the alternate destination, which is registered as RAD0 attribute in step 1602, is performed as alternate recording of the defective block detected in step 1601.

Figure 13:
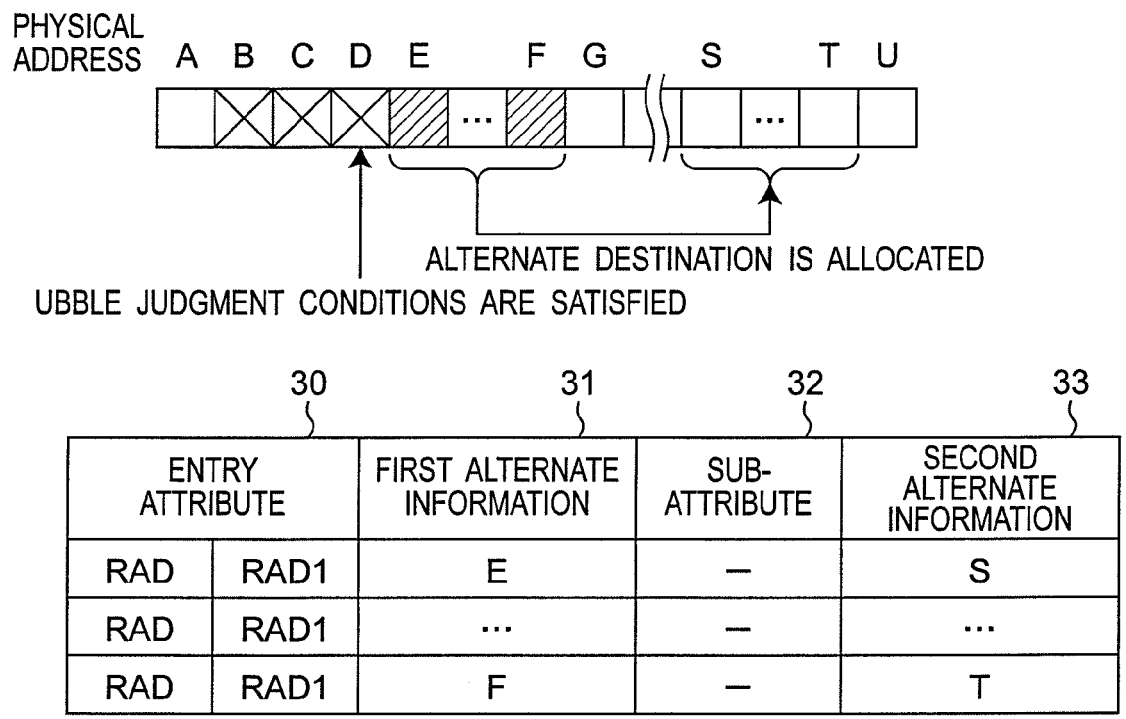
FIG. 13 is an explanatory view of processing at the time of detecting the sequential defect estimated areas in the optical disk recording/reproducing device according to the embodiment 1 of the present invention.

FIG. 13 is an explanatory view simplifying the procedure of FIG. 12. Explanation is given for a case in which, as shown in FIG. 13, the blocks of PSN:D are judged to be defective during recording processing, satisfying the condition shown in the aforementioned (2) sequential defective area judgment method. In this case, prescribed numbers of blocks (the blocks of PSN:E to the blocks of PSN:F) after this defective block (D) are regarded as defective, and each of them allocated to the alternate destinations (corresponding to the blocks from the blocks of PSN:S to the blocks of PSN:T), is registered in the DFL as the alternate entry of the RAD1 attribute.

Each block is registered in the DFL as the RAD1 attribute here, for utilizing the characteristic of the RAD1 attribute explained in the aforementioned FIG. 8, etc. Namely, at this point, actual recording processing is not performed yet to the blocks allocated as the alternate destinations of the sequential defect estimated areas, and therefore each block is registered as the RAD1 attribute. It is so controlled that when the recording request is received, recording processing is performed to the block of the alternate destination, and when the reading request is received, the reading processing is performed to the block of the alternate source. Specifically, for example, when certain data is recorded when the blocks of the physical address: F of FIG. 13 are detected as the sequential defective areas, and new data is not recorded thereafter, the data that exists in the blocks of PSN:F is effective data, and this data needs to be read-out when the reading request is received. At this time, by registering the blocks of PSN:F detected as the sequential defective areas, as the alternate entry of the RAD1 attribute, with these blocks set as the alternate sources, recording processing is performed to the blocks, namely the blocks of PSN:T allocated as the alternate destinations, when the new recording request is given. Meanwhile, when the reading request is received before the new recording processing is performed, it is so controlled that data is read-out from the blocks of the alternate sources, namely the blocks of PSN:F.

Note that as described above, in a case of a success of read-out to the alternate sources of the blocks, being the sequential defect estimated areas, in which the RAD1 attribute is registered, such blocks can be judged to be non-defective. Therefore, the alternate entry of the RAD1 attribute corresponding to these blocks may be deleted from the defect list. Alternately, it may be preferable to use a method of deleting all alternate entries of the RAD1 attribute, by setting the blocks after the aforementioned blocks registered as the sequential defect estimated areas, as the alternate sources.

Alternately, in the blocks to which the alternate destinations are allocated but recording to the alternate destinations is not performed, out of the blocks detected as the sequential defective areas in which the RAD1 attribute is registered as the entry attribute, when the blocks having data recorded therein by the previous recording processing exist in these blocks, there is a high possibility of failure in access to the sequential defective areas. Therefore, it is preferable to read-out the data recorded in these blocks and copy it to the blocks allocated as the alternate destinations, and change the entry attribute from the RAD1 attribute to the RAD0 attribute.

Here, when the recording request is given to the alternate sources registered as the RAD1 attribute, and recording is performed to the blocks of the alternate destinations, not the data in the block of the alternate source, but the data in the block of the alternate destination becomes effective. Therefore, the entry attribute is changed from the RAD1 attribute to the RAD0 attribute.

Here, as described above, regarding the blocks of PSN:D (namely, the defective blocks detected in step 1601) whereby the conditions are satisfied, it is confirmed that the alternate destinations are allocated when the blocks of PSN:D are detected as the defective blocks, and recording to these alternate destinations are performed. Since these defective blocks are separately registered as the alternate entry of the RAD0 attribute, and therefore these blocks are not included in the blocks to be registered as the aforementioned alternately entry of the RAD1 attribute. However, the following processing is also possible. Namely, these defective blocks are registered in the DFL as the alternate entry of the RAD1 attribute, and when actual recording to the alternate destinations are completed, the entry distribute is changed to the alternate entry of the RAD0 attribute.

The merit of using the aforementioned processing method is that only by performing the processing of registering the RAD1 attribute when the sequential defective areas are estimated, there is absolutely no necessity for concerning about the sequential defective areas due to mixing-in of the bubbles in the recording/reading processing thereafter. Accordingly, when the alternate entry is registered once in the DFL, the logic recording/reproducing part 113 performs access information calculation processing such as address conversion processing and sequential accessible numbers calculation processing by using disk management information such as DFL. Therefore, there is a merit that normal access information calculation processing and the aforementioned processing can be made common processing applied to the optical disk 1, being media.

In the optical disk recording/reproducing device 100, by executing the processing of registering the RAD1 attribute as described above, when the recording request to the blocks in the sequential defect estimated areas is received from the host device after this processing, block 3 in the spare area allocated as the alternate destination is calculated as actual access PSN, by the address conversion processing performed by the logic recording/reproducing part 113. Therefore, it is possible to perform recording processing to the spare area, being the alternate destination, in such a manner as avoiding the sequential defect estimated areas, without performing the recording processing to the sequential defect estimated areas. Therefore, deterioration in recording processing performance due to frequent alternate processing can be prevented, and by allocating the defective blocks of the sequential alternate sources to the sequential alternate destinations, sequential recording/sequential reading to/from the blocks of the alternate destinations can be performed.

Note that explanation has been given for the aforementioned processing method, with a case of BD-RE, being the rewritable optical disk, given as an example. However, this processing method may be applied to the write-once media such as BD-R, with the entry attribute of the registered alternate entry set as RAD or CRD. However, the alternate entry is registered in the DFL before actual recording processing is performed to the sequential defect estimated areas, and therefore almost no effect can be obtained even if this processing method is applied to the write-once media such as BD-R.

Note that explanation has been given for the aforementioned processing method, with entry attribute 30 of the alternate entry defined by BD-RE given as an example. However, used information is not limited thereto. More specifically, it is also preferable to provide the information showing the alternate entry registered by previous estimation, and in a case of the information having the same meaning and function, similar effects can be obtained even if such information is used.

Note that in a case of the rewritable media such as BD-RE, the optical disk recording/reproducing device 100 may perform inspection to the sequential defect estimated areas satisfying detection conditions and obtained by previous estimation and registered as the sequential defect estimated area, to examine whether or not these areas are actually defective, when the device is set in a non-busy state such as in an idling state (command waiting state). Specifically, it is preferable to use a method of performing inspection to the alternate entry of the RAD1 attribute, or an alternate source position of the alternate entry having information showing that it is registered by the previous estimation. Then, regarding the block judged to be OK in this inspection, the previously registered alternate entry may be deleted.

(4-2) Method of Intentionally Converting Address

This address conversion method of (4-2) is an effective method in the write-once media such as BD-R. Briefly speaking, when the sequential defective areas due to mixing-in of the bubbles are detected by the method explained in the aforementioned (2) sequential defective areas judgment method, the information regarding the sequential defect estimated areas which are estimated to be caused by mixing-in of the bubbles [specifically, the head physical address of the sequential defect estimated areas and an area size (or final physical address), etc.] is stored in the memory part 120 as the sequential defect estimated area information. Thereafter, when the recording request is given to the area shown by the sequential defect estimated area information, the spare area, being an alternate area, is calculated in the access information calculation processing. Then, when recording to the alternate destination is completed, the blocks are registered in the DFL as the alternate entry, with the blocks set as the alternate sources to which recording request is given, and the blocks of the spare area set as the alternate destinations in which recording is actually performed. Namely, newest DFL information in the DFL information storage buffer 160 is updated.

Figure 14:
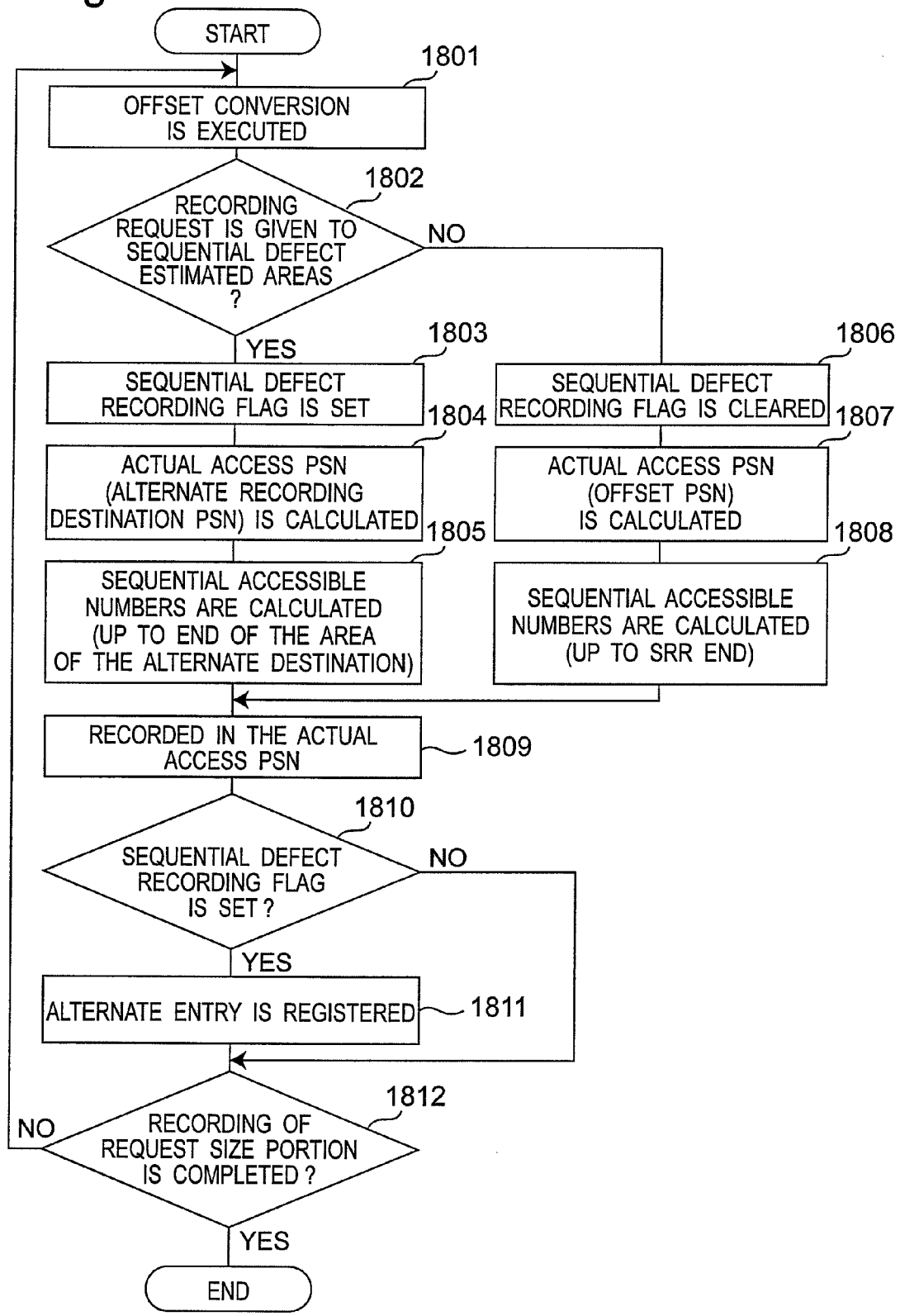
FIG. 14 is a flowchart explaining alternate processing at the time of detecting the sequential defect estimated areas using a memory, in the optical disk recording/reproducing device according to the embodiment 1 of the present invention.

FIG. 14 is a flowchart showing a processing procedure in recording, by using this address conversion method. In an example of the flowchart in FIG. 14, explanation will be given for a case of performing sequential recording to BD-R, being the write-once media. It is so assumed that the sequential defect estimated areas are already detected, and the information regarding the sequential defect estimated areas is set in the sequential defect estimated area information of the memory part 120.

First, the logic recording/reproducing part 113 in the system control part 110 performs access information calculation processing.

Step 1801: the logical address (LSN) that receives the recording request from the host device is offset-converted, for calculating offset PSN.

Step 1802: Next, the logic recording/reproducing part 113 judges whether or not the offset PSN obtained in step 1801 corresponds to the PSN in the areas held in the sequential defect estimated area information in the memory part 120. Specifically, when the offset PSN is larger than the head physical address and smaller than the end physical address held in the sequential defect estimated area information, it is so judged that recording is performed into the sequential defect estimated areas.

Step 1803: when it is so judged that recording is performed into the sequential defect estimated areas, the logic recording/reproducing part 113 sets sequential defect recording flags in the memory part 120.

Step 1804: next, the logic recording/reproducing part 113 calculates the alternate recording destination as the actual access PSN. Specifically, in a case of the write-once media, the spare area that can be used as the alternate recording destination is used in additional writing, and therefore the block that can be used as the alternate destination is calculated, with a position shown by NWA in the spare area set as actual access PSN. Here, as shown in FIG. 21, when a plurality of spare areas exist, the spare area to be used is obtained by the aforementioned method. Specifically, the position shown by NWA of the spare area closest to the offset PSN is calculated, in the spare area in which the blocks of the alternate destinations can be sequentially allocated, or the spare area is obtained by a method of selecting the spare area farther than the detected sequential defect estimated areas, as the alternate destinations.

Step 1805: next, the logic recording/reproducing part 113 calculates the sequential accessible numbers, namely the sequentially recordable numbers of blocks. Specifically, out of the recordable numbers of blocks (namely, unrecorded numbers of blocks) from the NWA position to the end in SRR where actual recording is supposed to be performed, and the recordable numbers of blocks from the NWA position to the end in the spare area allocated as the alternate destination, smaller one is calculated as the sequential recordable numbers of blocks.

Step 1806: when it is so judged in step 1802 that the recording is not performed into the sequential defect estimated area, the logic recording/reproducing part 113 clears the sequential defect recording flags in the memory part 120.

Step 1807: next, the logic recording/reproducing part 113 calculates the actual access PSN. Specifically, recording is performed sequentially, and therefore offset PSN corresponding to LSN requested to be recorded from the host device is calculated as the actual access PSN. Here, the offset PSN corresponding to LSN requested to be recorded from the host device is the sequential recording, and therefore coincides with the NWA position in SRR where recording is actually performed.

Step 1808: next, the logic recording/reproducing part 113 calculates the sequential accessible numbers, namely the sequentially recordable numbers of blocks. Specifically, the recordable numbers of blocks (namely, the unrecorded numbers of blocks) from the NWA position to the end, being the actual access PSN obtained in step 1807, are calculated as the sequentially recordable numbers of blocks.

The step so far is the access information calculation processing.

Step 1809: the system control part 110 performs recording of the data requested to be recorded from the host device. Specifically, the system control part 110 performs recording from the block calculated as the actual access PSN in the access information calculation processing. A data size recorded here is the data size requested to be recorded and a size of a smaller portion of the size obtained as the sequential recordable numbers of blocks.

Step 1810: whether or not recording in step 1809 is the recording into the sequential defect estimated areas is judged. Specifically, when the sequential defect recording flags are set, it is so judged that recording is performed into the sequential defect estimated areas. When the recording in step 1809 is not the recording into the sequential defect estimated areas, the processing is moved to step 1812 as will be described later.

Step 1811: when it is so judged that the recording is performed into the sequential defect estimated areas in step 1810, the logic recording/reproducing part 113 registers the alternate entry in the DFL, with the offset PSN corresponding to the logical address requested to be recorded set as the alternate source (first alternate information 31), and the position obtained as the actual access PSN set as the alternate destination (second alternate information 33). They are actually registered in the DFL data managed in the DFL information storage buffer 160. At this time, when the write-once media is BD-R, the alternate entry is registered as the alternate entry of RAD attribute when the number of recorded blocks is one, and is registered as the alternate entry of CRD attribute (head/end) when the numbers of recorded blocks are two or more.

Step 1812: it is judged whether or not data recording of the size requested to be recorded from the host device is completed. When it is so judged that the data recording is not completed in step 1812, the processing from step 1801 to step 1811 is repeated until the recording of the data size requested to be recorded completed. In these steps, in order to perform recording of a remained data size that can not be recorded, a recording destination and the remained recording data size are updated, and the actual access PSN and the sequentially recordable numbers of blocks are obtained again, to perform actual recording, and the alternate entry is registered if necessary.

The processing procedure is thus performed, when the recording request is received from the host device. Note that the reading request of the data from the host device is calculated and processed by the same method as that of a normal access information calculation processing, and a specific processing is not performed.

As described above, in the aforementioned address conversion method, the information regarding the sequential defect estimated area caused by mixing-in of the bubbles is previously stored in the memory part 120, and when the position requested to be recorded is located in the block within the sequential defect estimated area, at the time of the address conversion processing in the access information calculation processing, by not using the information of DFL but by obtaining the actual access PSN, with the spare area that can be used at this point set as the alternate recording destination, retreat recording to the alternate recording destination is realized.

Note that the aforementioned address conversion method has been explained, with a case of BD-R, being the write-once media, taken as an example. However, even if this conversion method is applied to the media other than the write-once media, such as BD-RE, being the rewritable media, the similar effects can be obtained.

Note that in the aforementioned address conversion method, explanation has been given, with the sequential recording to the BD-R, being the write-once media, taken as an example. However, the present invention can also be applied to a case of a pseudo OW (Over Write) recording defined in the BD-R. In a case of the pseudo OW recording, whether or not the offset PSN is located within the sequential defect estimated areas is judged in step 1802. However, similar effects can be obtained by similar processing procedure as the aforementioned address conversion method, excluding a point that whether or not the pseudo OW alternate recording destination PSN is located within the sequential estimated areas is judged, and a point that the actual access PSN calculated in step 1807 coincides with not the offset PSN but the pseudo OW alternate destination PSN.

The merit of using the aforementioned address conversion method is the point that this address conversion method can be applied commonly to the write-once media and the rewritable media, because whether or not recording is performed to the sequential defect estimated areas is taken into consideration to perform processing.

Note that in the embodiment 1 according to the present invention, explanation has been given, with the mixing-in of the bubbles taken as an example of a factor of sequential defects. However, the sequential defective areas are not treated as the areas caused only by mixing-in of the bubbles. Namely, the method explained in the embodiment 1 is an effective method to scratches such as resulting in failure in sequential recording similarly to the case of mixing-in of the bubbles.

According to the embodiment 1 of the present invention, explanation has been given, wherein the spare areas, being the alternate areas for defects in the user data areas, are allocated as the alternate recording destinations of the sequential defective areas caused by mixing-in of the bubbles. However, not only necessarily the spare areas but also the areas that can be used as the alternate destinations may be used for the areas as the alternate recording destinations.

According to the embodiment 1 of the present invention, explanation has been given for an example of detecting the sequential defective areas caused by mixing-in of the bubbles in the user data area. However, this method may be used for detecting the sequential defective areas in the spare area which is used as the alternate destination. Specifically, for example, in a case of the BD-RE, being the rewritable media, when the block in the spare area is judged to be invaded by sequential defects, it is preferable to use a method of replacing the block in the spare area by UNUSE attribute. It is also preferable to use a method of allocating the spare area different from itself, as the block of the recording destination of the alternate recording, because if the block in the spare area is detected as the defective block, it can be said that alternate recording is being performed to the spare area.

Embodiment 2

Explanation will be given hereunder for a defect management method and a defect management device by using the optical disk recording/reproducing device according to an embodiment 2 of the present invention, with reference to the attached drawings. In the embodiment 2 of the present invention, the defect management method in the optical disk recording/reproducing device and the stream processing of the defect management device will be explained.

(1) Structure of the Optical Disk Recording/Reproducing Device

The optical disk recording/reproducing device according to the embodiment 2 has substantially the same structure as the structure of the optical disk recording/reproducing device 100 shown in an item of "(1) Structure of the optical disk recording/reproducing device" according to the embodiment 1, in terms of a circuit structure (micro processor, etc.) (see FIG. 1). However, a processing program of a system control part 110 is different, with the logic recording/reproducing part 113 and the data cache part 114 set as a center. A function of this processing program will be described later.

(2) Sequential Defective Area Judgment Method

The sequential defective area judgment method according to the embodiment 2 is the same as the method shown in the "(2) Sequential defective area judgment method" in the aforementioned embodiment 1, including an execution program, and explanation therefore will not be repeated hereunder.

(3) Specification of the Sequential Defect Estimated Area

Stream recording is the processing widely used in a recorder device in which real-time property of data recording/reading processing is requested as described above. Therefore, the stream recording is the processing of not performing alternate recording/alternate reading to the alternate destination such as the spare area, even if defects are detected.

However, of course even in the stream recording also, when defects exist in the recording area, in order to maintain a quality of recorded data, there is a desire for performing recording processing so as to avoid the defective area. Namely, since even if the data is recorded in the defective block, it can not be recorded correctly, this data is missed in read-out processing, resulting in a state in which a reproduced picture is disturbed or stops, for example. In order to avoid such a state, there is a method called slip recording processing in the stream recording. If simply explained, this slip recording processing is a method of recording data by replacing (slipping) the block with the block subsequent to the defective block, for the purpose of more reducing a loss time due to seek than the time required for alternate recording to the alternate area such as a spare area as much as possible, when the block to be recorded is defective. However, if the slip recording is sequentially repeated, data amount that can be read-out is decreased in reading the data recorded in this part, resulting in stop of the reproduced picture. Of course the time required for stopping the reproduced picture affects the amount of data that can be read-out, and therefore fewer slip recording is preferable.

When the sequential defective areas exist, caused by mixing-in of the bubbles, even if the data is recorded in these defective areas, it can not be read-out. However, when the slip recording is performed, with the sequential defective portions collectively regarded as defects, the sequential defective portions being explained in the "(3) Specification of the sequential defect estimated area" of the aforementioned embodiment 1, the time required for stopping the reproduced picture in reading-out the data is extremely prolonged.

According to the embodiment 2, in order to solve the above-described problem, a method is adopted in which although the sequential defect estimated area is treated as having the same size as the case of the embodiment 1, alternate entries are not collectively registered in the DFL, and the sequential defect estimated areas are treated in a divided state, and actual recording is tried at each seam of the divided size. In this method in which dividing processing is performed, there is a possibility that error in detection occurs even in a case of the sequential defect estimated areas, or there is also a possibility that recordable blocks exist even in the sequential defect estimated areas. Therefore in consideration of these possibilities, an object of the present invention is to suppress the number of slips smaller as much as possible.

Details of the aforementioned method of performing dividing processing will be explained in the (4) Countermeasure at the time of detecting the sequential defect estimated areas described hereunder.

(4) Countermeasure at the Time of Detecting the Sequential Defect Estimated Areas First of all, brief explanation will be given for the access information calculation processing in the stream processing.

In the stream processing of the embodiment 2, in the same way as the case of the PC processing, being the normal processing explained in the aforementioned embodiment 1, the address conversion processing and the sequential accessible numbers calculation processing are performed. However, each processing method thereof is different from each other.

Specifically, in the address conversion processing in the stream processing, only the offset conversion processing is performed, and the address conversion processing using the management information such as DFL is not performed. In addition, in the sequential accessible numbers calculation processing, even if the defects shown in the alternate entry exist, existence of these defects is not taken into consideration, and numbers up to the end of this area (for example, in a case of the media having two layers of recording layers, the end of this layer) are set as the sequential accessible numbers and calculated.

Note that in stream reproduction of the stream processing, reading-out of data is performed without considering the defects, etc. Therefore, data read-out fails in some cases. In such a case, by reporting to the host device the failure in reading-out of data, generally the data used as the reproduced picture is selected on the side of the host device.

Figure 15:
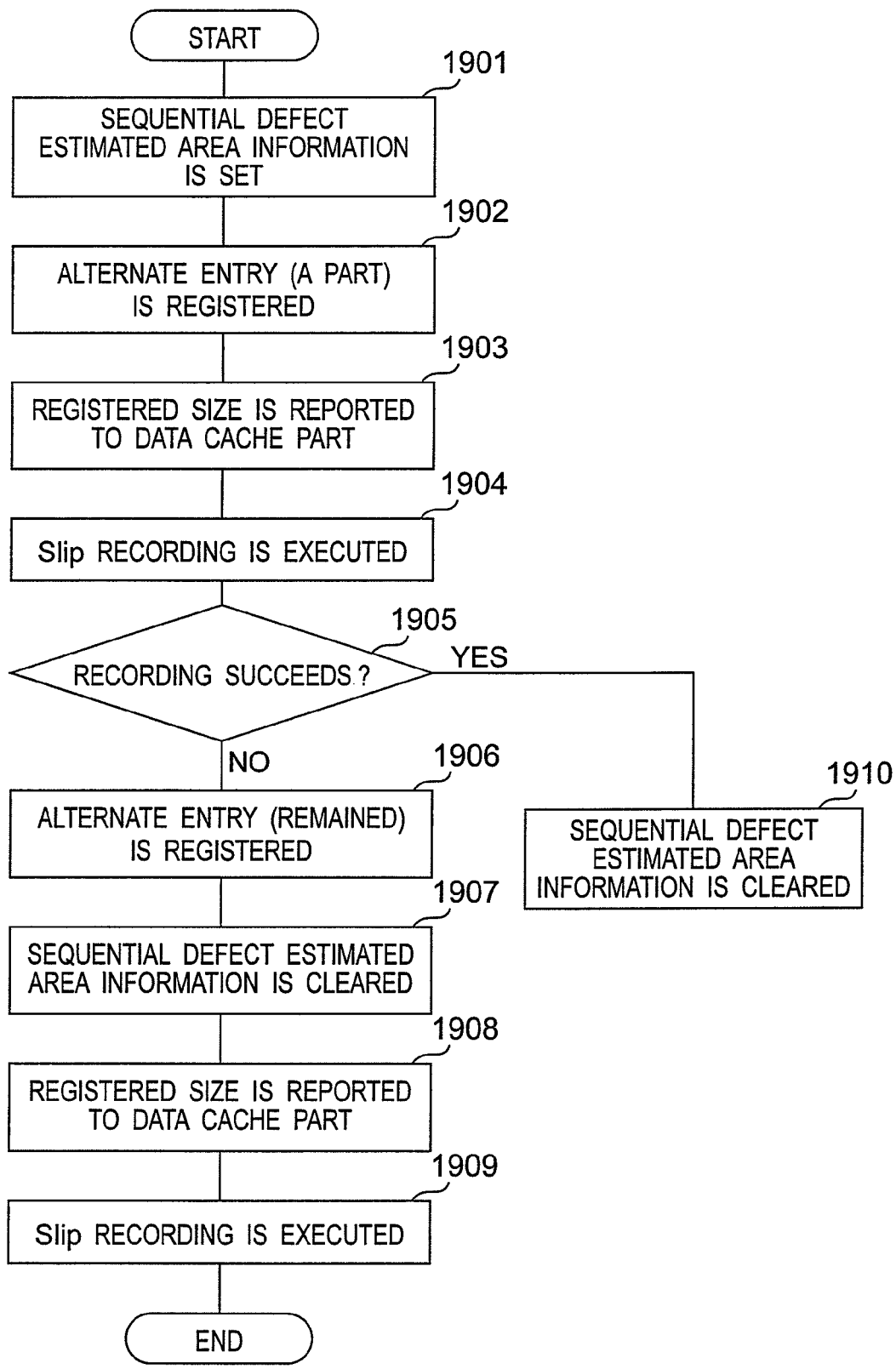
FIG. 15 is a flowchart explaining a procedure of response processing of the sequential defective areas in stream recording, in the optical disk recording/reproducing device according to an embodiment 2 of the present invention.

FIG. 15 is a flowchart showing the processing procedure performed by the system control part 110, when the sequential defective areas are detected at the time of the stream recording of the stream processing, in BD-RE, being the rewritable media.

Note that in the case of the stream recording, unlike the case of the PC recording of the PC processing, firstly, the area (abbreviated as the stream area hereunder) used for recording is set from the host device, and the recording request is given to this stream area in the form of not showing the address. Then, recording is performed while controlling the recording destination address to sequentially perform recording in the set stream area, by the data cache part 114 of the system control part 110 for managing recorded data.

Step 1901: when the sequential defective areas are detected in recording to a certain block (abbreviated as a reference block hereunder), the logic recording/reproducing part 113 registers the head physical address of the reference block judged to be the sequential defective areas, in the sequential defect estimated area information. Also, the number of blocks (size) obtained by the method explained in the "(3) Specification of the sequential defect estimated area" in the aforementioned embodiment 1 is registered in the sequential defect estimated area information, as the number of blocks (size) of the sequential defective areas.

Step 1902: the logic recording/reproducing part 113 registers the alternate entry (a part) in the DFL, in the same way as the method explained in the "Countermeasure using (4-1) defect list (DFL)" according to the aforementioned embodiment 1, with the areas of a prescribed size subsequent to the reference block, which is judged to be the sequential defective areas, set as the addresses of the defective blocks.

Here, the prescribed size of the area subsequent to the reference block judged to be the sequential defective areas is a smaller size than the size of an overall sequential defect estimated areas. This prescribed size is preferably decided in consideration of a size capable of being jumped by abnormal jump that can be caused by defects, the time required for reproducing pictures, and further a remaining size of the stream area set from the host device, etc. According to the embodiment 2, this prescribed size is set at the size of five tracks, for example.

In addition, the alternate entry is registered in the DFL, with the entry attribute 30 of the alternate entry to be registered set as RAD1 attribute or set as NRD attribute or PBA attribute when the spare areas exist, and set as NRD attribute or PBA attribute when the spare areas do not exist.

Step 1903: the logic recording/reproducing part 113 reports to the data cache part 114 the number of blocks, with the alternate entry registered in the DFL as an object of slipping.

Step 1904: under control of the data cache part 114 that receives the report, in order to slip-record the number of blocks thus reported, the data to be recorded in the reference block is re-recorded in the block before several numbers of reported blocks (abbreviated as the block of slip destination hereunder). The system control part 110 performs re-recording to the block of this slip destination. Note that at this time, the data cache part 114 reports the slip-recorded number of blocks to the host device, because the size of a usable stream area set from the host device is reduced by the portion of slip recording.

Step 1905: success or failure of the recording to the block of the slip destination is judged.

Step 1910: in step 1905, when it is so judged that the recording to the block of the slip destination succeeds, the sequential defect estimated area information is cleared, and the thereafter the stream recording is normally executed.

Step 1906: in step 1905, when the recording to the block of the slip destination fails, the areas to be recorded are judged to be the sequential defective areas, and alternate entries are registered in the DFL, the alternate entries being the portions of the remaining size (the number of blocks) obtained by subtracting 5 track portions registered in the aforementioned step 1902 from the size of the sequential defective areas held as the sequential defect estimated area information.

Step 1907: next, the sequential defect estimated area information is cleared.

Step 1908: the number of blocks registered as the alternate entries in step 1906 is reported to the data cache part 114.

Step 1909: under the control of the cache part 114 that receives the report, in the same way as step 1904, the data to be recorded in the reference block is re-recorded in the block before several numbers of reported blocks. Note that in this slip-recording, the data cache part 114 reports the slip-recorded number of blocks to the host device, because the size of a usable stream area set from the host device is reduced by the portion of slip recording.

As described above, the explanation has been given for the processing procedure corresponding to the sequential defective areas in stream recording.

Note that the aforementioned stream recording has been explained, so that only one trial recording (corresponding to step 1902 to step 1904) is performed into the sequential defect estimated areas. However, this trial recording may be performed multiple numbers of times. When the trial recording is performed multiple numbers of times, the number of blocks partially registered as the alternate entries may be changed for each trial recording.

Note that when the slip recording due to the sequential defective areas occurs, it is effective to perform control in cooperation with the host device. Namely, based on the data from the data cache part 114, the sequential defective areas are detected, and when the host device so recognizes that the slip recording occurs, processing such as discarding the previously set stream area once and newly resetting the stream area in consideration of the sequential defective areas. Such processing is more effective than the processing performed by the optical disk recording/reproducing device 100 alone.

Note that in the embodiment 2, numerical values used in the processing of responding to the sequential defective areas for explaining the stream recording are absolutely a specific example, and the present invention is not limited to these values, and it is preferable to set these values to achieve the object similar to that of the aforementioned processing.

Note that in the embodiment 2, explanation has been given, with a case of BD-RE, being the rewritable media as an example. However, the present invention may be applied to BD-R, being the write-once media, and in this case also, similar effects can be obtained.

Note that in a case of the normal processing (PC processing) of the aforementioned embodiment 1, explanation has been given, with the case of the stream processing taken as an example in the embodiment 2. However, combination of these processing is not limited by the present invention. Namely, for example, similar effects can also be obtained even if the method explained in the embodiment 2 is used for the PC processing.

Note that in either of the embodiment 1 and the embodiment 2, explanation has been given, with the defects due to mixing-in of the bubbles taken as an example of the defects extending across plural tracks. However, needless to say, the present invention can be used in the defect other than the defect due to mixing-in of the bubbles, by controlling the judgment method of the sequential defective areas and the judgment conditions.

Figure 16:
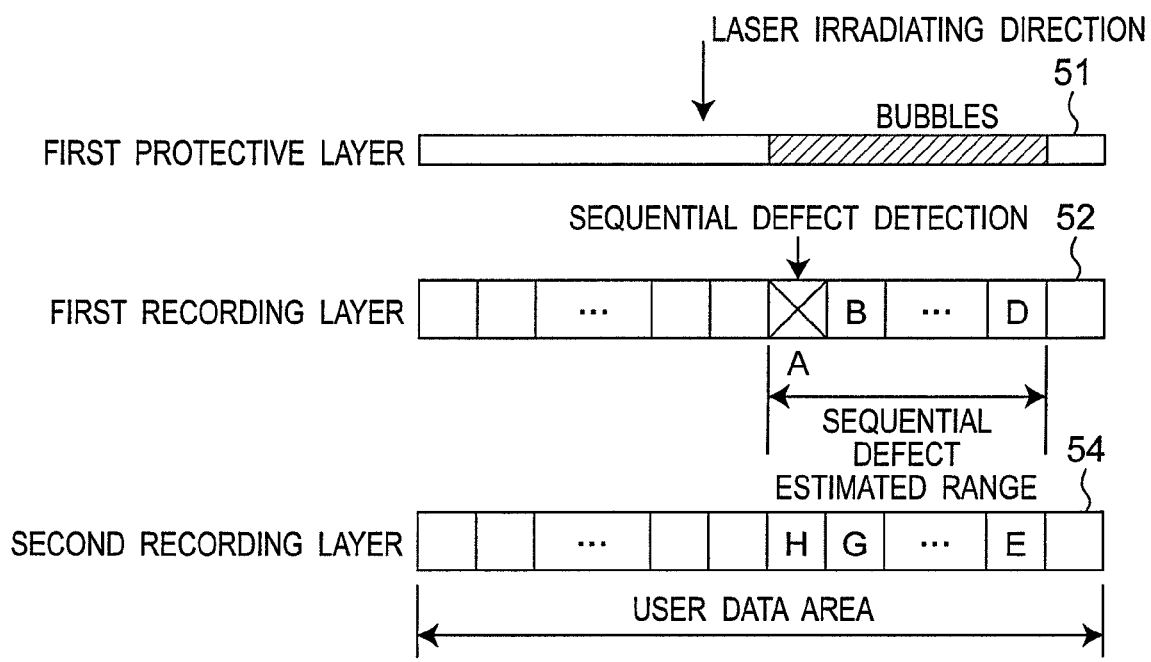
FIG. 16 is an explanatory view showing an example of a method of allocating the sequential defect estimated areas in an information recording medium having a plurality of recording layers in the optical recording/reproducing device according to the embodiment 2 of the present invention.

Note that when the bubbles are mixed in the optical disk, not only the irradiated light but also the reflected light is influenced by the bubbles, and in consideration of this characteristic of the bubbles, according to the embodiment 1 and the embodiment 2, in a case of the optical disk 1, being the media having a plurality of recording layers, it is effective to use a method of similarly treating the areas of other layers in a position of the same radius as that of the areas estimated to be the sequential defect estimated areas, as the sequential defect estimated areas. Specifically, as shown in FIG. 16, when the first recording layer 52 is formed on the side closer to the disk surface than the second recording layer 54, since the laser beam is emitted from the side of the first protective layer 51, the area of each layer that exists in the same radius position as that of the bubbles is also easily influenced by the bubbles when the bubbles exist in the first protective layer 51. Therefore, for example when the conditions of the sequential defect estimation are satisfied in the block of PSN:A of the first recording layer 52, it is also preferable to use a method of regarding a range from PSN:B to PSN:D as the sequential defect estimated areas, and regarding a range from PSN:E to PSN:H (or PSN:G) of the second recording layer that exist in the same radius position as that of the aforementioned areas as similarly the sequential defect estimated areas.

Note that the following case can be assumed. Namely, the sequential defect estimated areas are detected, in a state that the alternate destinations can not be allocated, because no more usable spare areas exist as the alternate destinations of the defective blocks. In such a case, according to the embodiment 1 and the embodiment 2, for example in a case of the BD-RE, being the rewritable optical disk, although the alternate destinations can not be allocated, the alternate entry may be registered as the alternate entry of NRD attribute or PBA attribute showing the sequential defect estimated areas, as defect positions. Thus, in a case of a device such as a recorder, by registering the area having high possibility of defects as the alternate entry, the stream area can be set so as to avoid this area.

Embodiment 3

Explanation will be given hereunder for the defect management method and the defect management device by using the optical disk recording/reproducing device of an embodiment 3 of the present invention, with reference to the attached drawings. According to the embodiment 3 of the present invention, the optical disk recording/reproducing device of the aforementioned embodiment 1 is further specifically shown. Accordingly, in the explanation of the embodiment 3, the same signs and numerals are assigned to the one having the same function and structure as those of the aforementioned embodiment 1, and explanation therefore will not be repeated hereunder.

(1) Structure of the Optical Disk Recording/Reproducing Device

Figure 17:
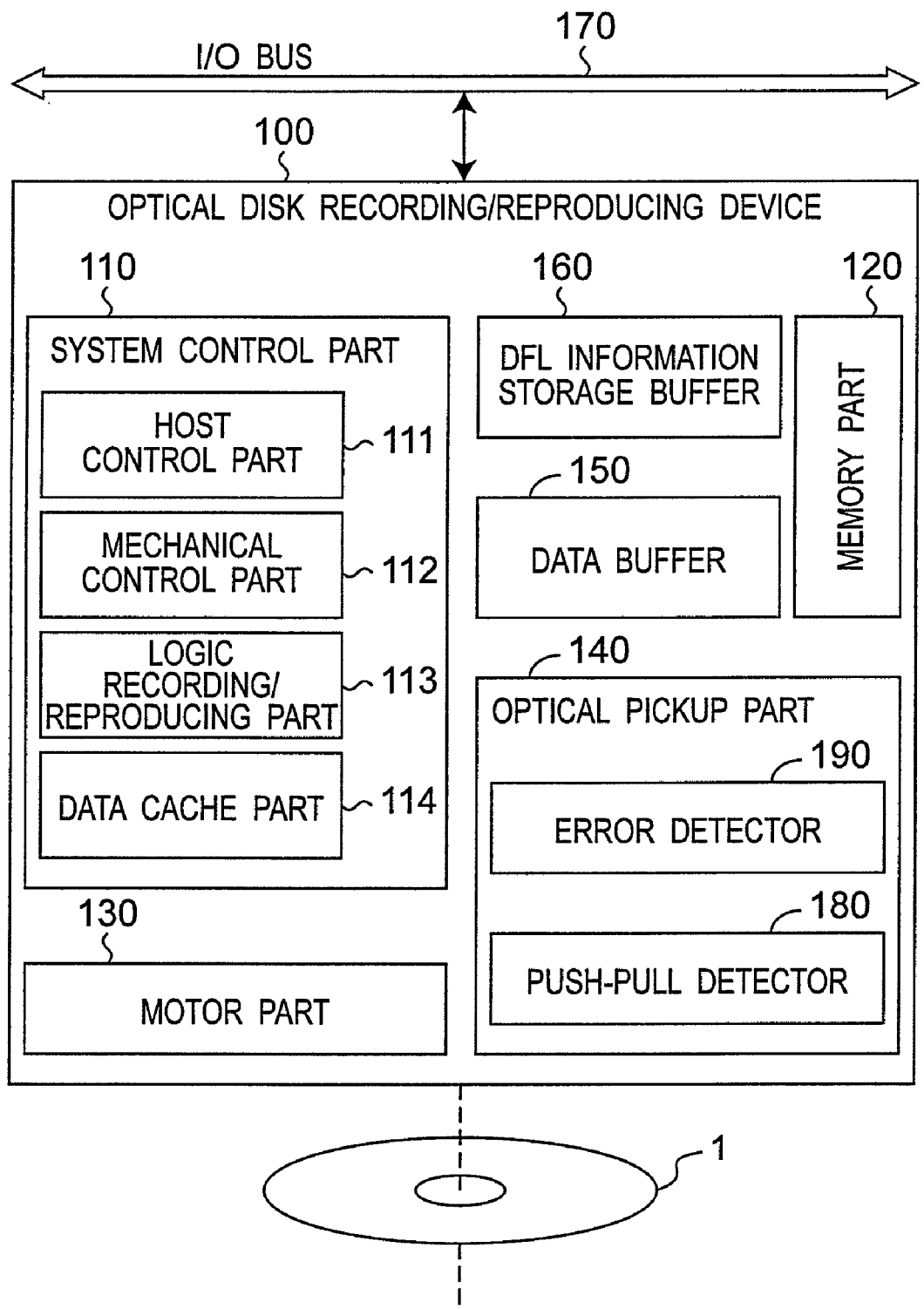
FIG. 17 is a block diagram showing a structure of the optical disk recording/reproducing device according to an embodiment 3 of the present invention.

FIG. 17 is a block diagram showing the structure of the optical disk recording/reproducing device 100 of the embodiment 3 of the present invention.

The optical disk recording/reproducing device 100 is connected to a host control device (not shown) via an I/O bus 170. A host computer is typically given as an example of the host control device.

The optical disk recording/reproducing device 100 functionally includes the system control part 110 that performs control of the overall optical disk recording/reproducing device 100, the memory part 120, the motor part 130 for rotating the optical disk 1, the optical pickup part 140, the data buffer 150, and the DFL information storage buffer 160. In addition, the optical pickup part 140 includes a push-pull detector 180 and an error detector 190. In the optical disk recording/reproducing device 100 of the embodiment 3, the push-pull detector 180 provided in the optical pickup part 140 obtains a difference signal directed to the center of the track 2 from the reflected light received by the optical pickup, and judges a deviation (namely, tracking error) between the irradiated light and the track 2, from a tracking error signal (TE signal) obtained from a signal of the low frequency side and an address signal obtained from the high frequency side. In addition, the error detector 190 provided in the optical pickup part 140 judges the error generated during recording/reproducing processing performed to the optical disk 1, such as the tracking error detected by the push-pull detector 180.

The system control part 110 is constituted of the host control part 111, the mechanical control part 112, the logic recording/reproducing part 113, and the data cache part 114. The host control part 111 processes the command from the host control device. The mechanical control part 112 controls a mechanism provided in the optical disk recording/reproducing device 100 such as the motor part 130 and the optical pickup part 140, and allows the optical pickup of the optical pickup part 140 to move (seek) to a target position. In addition, the mechanical control part 112 controls the recording processing or the reading processing of data to the optical disk 1, in consideration of an error judgment result from the error detector 190. The logic recording/reproducing part 113 performs control such as managing the information such as DFL21 stored in the defect information storage buffer (abbreviated as the DFL information storage buffer hereunder), and converting the logical address (LSN) requested to be recorded or read-out into/from the host control device to an access object address (PSN) on an actual optical disk 1. The data cache part 114 manages recorded data and read-out data in the data buffer 150.

In the aforementioned embodiment 1, detailed explanation has been given for the management method of the information regarding the defect positions and the alternate destinations of the optical disk 1 using the DFL information storage buffer 160 according to the embodiment 3 of the present invention, and therefore further explanation therefore will not be repeated hereunder.

Also, (2) the sequential defective area judgment method, (3) specification of the sequential defect estimated areas, and (4) countermeasure at time of detecting the sequential defect estimated areas, are substantially the same methods as the method of the optical disk generation device according to the embodiment 1, and therefore in the explanation given hereunder, different points from the embodiment 1 will be described.

(2) Judgment Method of the Sequential Defective Areas

Next, explanation will be given for a method of estimating and judging the sequential defective areas such as the bubbles by the optical disk recording/reproducing device 100 of the embodiment 3. Note that explanation of an overlapped portion with the aforementioned embodiment 1 will not be repeated hereunder.

As described above, the bubbles with a size of about 100 μm, exist in such a manner as extending about 300 tracks. As a result, the block having the bubbles mixed therein has sometimes a possibility that even physical address information such as ADIP-AUN embedded along the track at the time of manufacturing the disk can not be read. Further in many cases, it is difficult to set the optical pickup along the track, for performing recording/reproducing processing of data to a target area along the track, with the help of the reflected light obtained by irradiating the disk with light. More specifically, in the push-pull detector 180 for judging whether the optical pickup is set along the track, noise is generated in the difference signal used in this judgment, under an influence of mixing-in of the bubbles. Therefore, in the area in which the bubbles are mixed-in, errors related to tracking are very easily generated, such as erroneously judging the deviation of tracking, although actually the optical pickup is correctly set along a target track; not correctly acquiring the address information; or allowing abnormal jump to occur, such as erroneously jumping (abnormal jumping) to the track near the target track to be set along this track.

For example, if the area invaded by bubbles has a size of 100 μm, basically the defective blocks exist sequentially at substantially the same position (namely in a diameter direction) periodically across a plurality of tracks, because the track has a size of 0.32 μm. More specifically, the defective blocks exist periodically almost every one round of track.

However, as described above, when a certain block of designated address is accessed, the optical disk recording/reproducing device 100, being an optical disk drive, generally performs synchronization with an access position. More specifically, the following processing is performed. Namely, by moving (seeking) the optical pickup directed to the address of the block several blocks before (one or two blocks before in many cases) the address of the block to be accessed, and utilizing the rotation of the optical disk 1, the optical pickup is allowed to reach the block of the address to be accessed, while maintaining a tracking state along the track thereafter. Therefore, even if the block itself to be accessed is not invaded by the bubbles, when there is the defective block in the blocks several blocks before, error occurs, such as not acquiring the address (NG in address acquisition), or regarding tracking such as jumping (abnormal jumping) to an unintentional area. Therefore, the optical pickup can not reach the block, being a target address (the block, being the target, can not be accessed), resulting in an erroneous judgment that the block to be accessed is defective in many cases.

As described in the aforementioned embodiment 1, the following characteristics can be given as the defect due to the bubbles:

(A) a case of a failure in writing or writing & verifying, (B) a case of NG in acquisition of address or abnormal servo tracing represented by abnormal jump when address acquisition is NG, (C) a case of existence of sequential defective blocks in a diameter direction, and (D) a case of existence of sequential defective blocks in a circumferential direction.

Therefore, in consideration of the aforementioned characteristics in a case of the defective blocks due to mixing-in of the bubbles, in the embodiment 3, when any one of the conditions shown below is satisfied by the detected defective blocks, it is so estimated and judged that the bubbles exist in this optical disk 1.

Namely, when the defect is caused by writing error, and in a case of NG in acquisition of address or tracking error, and when the conditions of the following i), ii) or iii) are satisfied by the frontward or backward or frontward and backward of the defective block including this defective block, it is so estimated and judged that the bubbles exist in this optical disk. Here, the frontward refers to a direction of the block in which the block is already traced in a direction of tracing the track of the optical disk by the optical pickup along with the rotation of the optical disk 1, and the backward refers to a direction of the block in which the block is not traced yet.

i) A case of detecting N (N is a positive number of 1 or more) defective blocks sequentially in the diameter direction;

ii) a case of detecting M (M is a positive number of 1 or more) defective blocks sequentially in the circumferential direction, or iii) a case of detecting L (L is a positive number of 1 or more) in a prescribed range.

When either one of the conditions of ii) or iii) is satisfied, it is so estimated and judged that the bubbles exist in this optical disk.

According to the embodiment 3 of the present invention, explanation will be given for a case in which N and M are respectively set at 3, and the defective blocks are sequentially detected frontward. However, the present invention is not limited to these numerical values.

Figure 18:
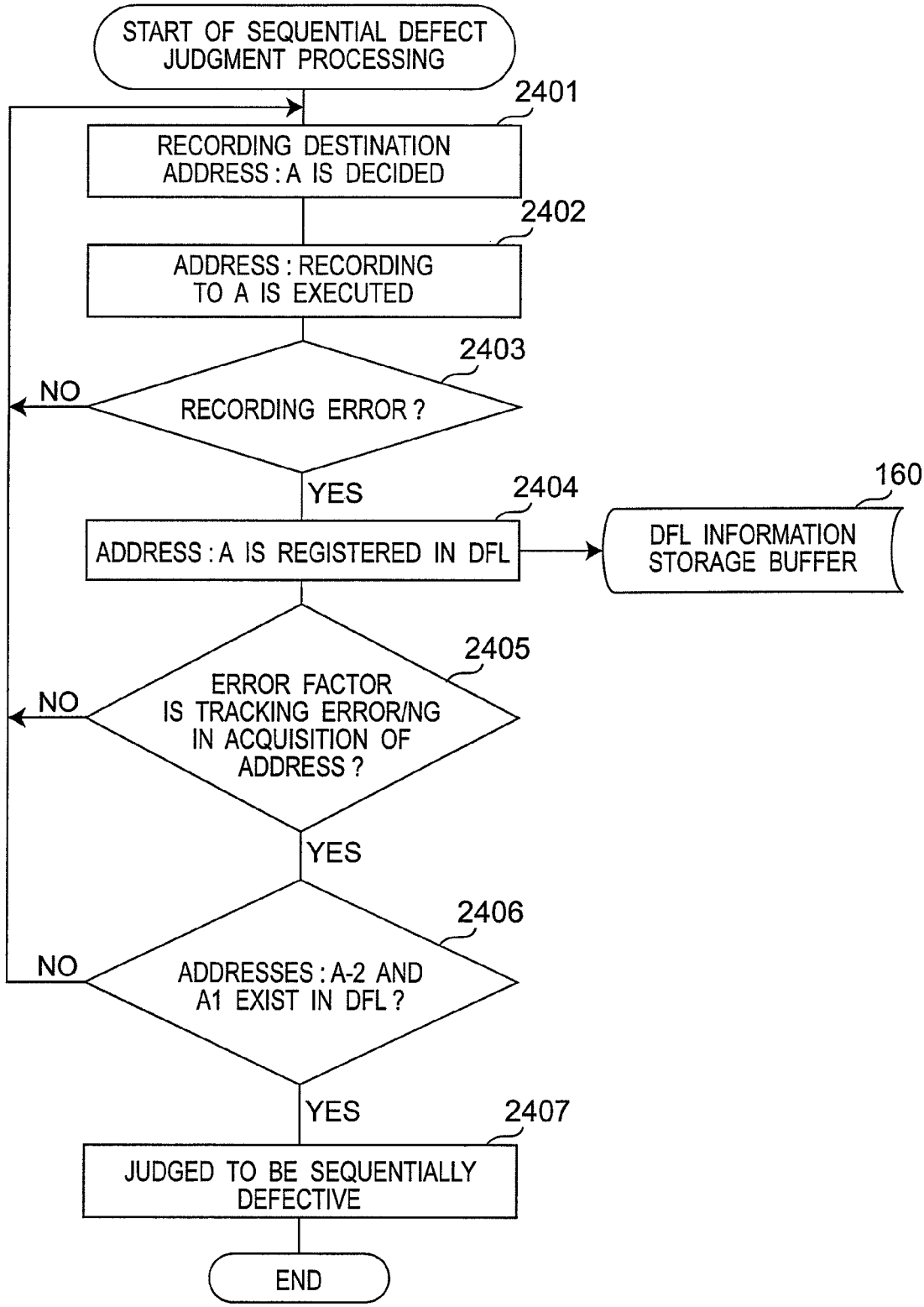
FIG. 18 is a flowchart explaining a procedure of sequential defect judgment processing in the optical disk recording/reproducing device according to an embodiment 3 of the present invention.

Next, the judgment processing according to the embodiment 3 will be briefly explained by using a flowchart. FIG. 18 is the flowchart showing a sequential defect judgment processing procedure represented by bubbles, in the optical disk recording/reproducing device of the embodiment 3, and a case of M=3 is taken as an example.

Step 2401: head address (A) for performing recording processing and a recording size are decided. More specifically, the host control part 111 in the system control part 110 decides the head address (A) for performing recording processing based on the recording request given from the host PC (not shown) and the recording size, which are then stored therein.

Step 2402: recording processing is executed to the address decided in step 2401. More specifically, under the control of the mechanical control part 112 in the system control part 110, in order to perform recording processing to the head address A, the optical pickup is allowed to move (seek) directed to several tracks before (namely, addresses A-2 to A-1) necessary for synchronization. Then, after the optical pickup part 140 performs each kind of setting necessary for recording, recording to the address: A is executed.

Step 2403: whether or not recording in step 2402 is correctly executed is judged. More specifically, the error detector 190 confirms whether or not some error such as a tracking error judgment result in the push-pull detector 180, occurs during recording processing, and reports this result to the system control part 110.

When some write error occurs, the error factor is stored, and the processing is advanced to step 2404.

When the write error does not occur (namely when the recording processing can be correctly executed), the processing is returned to step 2401 to respond to the next recording request.

Step 2404: the address (A), which is failed in recording, is registered in the defect list (DFL) as defect information. More specifically, the logic recording/reproducing part 113 in the system control part 110 registers the address failed in recording (namely defective address) in the DFL as the defect information. More specifically, this defect information is registered in newest DFL information in the DFL information storage buffer 160.

Step 2405: whether or not the error factor of the write error judged in step 2403 is caused by the tracking error or NG in acquisition of the address is judged. More specifically, the mechanical control part 112 in the system control part 110 confirms the error factor stored in step 2403 and judges by what factor the write error is caused.

In a case of the error due to the tracking error or NG in acquisition of the address, the processing is advanced to step 2406.

In a case of the error not caused by the tracking error or NG in acquisition of the address, the processing is returned to step 2401 to respond to the next recording request.

Step 2406: whether or not there are three sequential defective blocks is judged. More specifically, the logic recording/reproducing part 113 in the system control part 110 judges whether or not addresses: A-2 and A-1 sequential before the address A judged to be error this time are already registered in the DFL. More specifically, it judges whether or not two defective blocks (A-2, A-1) before the address A judged to be error this time are sequentially registered in the DFL information storage buffer 160.

Note that although explanation is given for an example of the judgment processing when three blocks frontward are sequentially defective, needless to say, the direction of confirming whether the sequential defective blocks are registered, is not limited to the three blocks frontward, and may be three blocks backward or may be three blocks frontward and backward sequentially, and the judgment processing may be performed based on these directions.

Three sequential blocks here are given as the aforementioned example, and it is preferable to perform judgment processing whether or not the aforementioned sequential defect judgment conditions i) and ii) or iii) is satisfied, and the present invention is not limited to the number of three blocks.

Note that when the sequential blocks are not registered in the DFL, the processing is returned to step 2401 to respond to the next recording request.

When the three blocks are sequentially registered in the DFL, the processing is advanced to step 2407.

Step 2407: it is so judged that the sequential defective areas represented by bubbles exist in this optical disk.

In addition, the areas estimated to be the sequential defective areas due to bubbles by the aforementioned method called the sequential defect estimated areas hereunder.

In the aforementioned method, regarding i) and ii), sequentiality is judged by using the alternate entry registered in the DFL. Namely, whether or not the alternate entry exists is judged, with the address in the diameter direction of the address of this defective block or the address of the block one block before in the circumferential direction set as the alternate source. Note that in the explanation for the aforementioned method, a case of sequential defective blocks frontward is given as an example, and this is because a case such as sequential recording is assumed.

Note that it is also preferable to use a method of confirming the sequentiality by not using the DFL in judging the sequentiality but putting importance on a case of sequential recording, for example, then maintaining prescribed numbers of defective block information in the memory part 120, and using only this defective block information.

In addition, whether or not the defect is caused by write error is judged, and regarding the error factor, only the defective block judged to be defective is judged in the embodiment 1 of the present invention, and regarding the forward and backward block for confirming the sequentiality, a method of not confirming its defect factor is used. This is based on the fact that such information is not included in the alternate entry of the DFL used for confirming the sequentiality. However, for example, when defect factor information, etc., is included in the information used in judging the sequentiality, it is also preferable to use a method of perform judgment including the defect factor of the frontward and backward blocks used for judging the sequentiality. Further, the defect factor information may also be included in the alternate entry itself.

Note that N and M are set to 3 respectively, and this is the numerical value, as described in the aforementioned embodiment 1, in consideration of not allowing time-out to occur, which is an object of the present invention to be solved, and is the numerical value defined so as not to allow the time-out of 7.5 seconds to occur, which is used particularly by a host computer. Also, sequential number M=3 in the circumferential direction is defined in consideration of the characteristic of seek processing of the optical disk recording/reproducing device. Further, the sequential number N=3 in the diameter direction is the numerical value defined in consideration of the number of tracks having the possibility of actually jumping when the abnormal jumping occurs.

Note that these values are given absolutely as an example, and it is preferable to obtain the same effects, and the present invention is not limited to these numerical values.

Note that the method of judging the areas to be the sequential defective areas is not limited to the aforementioned method. For example, when the bubbles exist on the inner circumferential side of the optical disk, basically almost all clusters are judged to be sequentially defective, because one track of the inner circumferential side is constituted of two blocks. In addition, when the bubbles exist on the outer circumferential side of the optical disk, several blocks of five blocks has a possibility of normally accessed, because one track of the outer circumferential side is constituted of five blocks, and the defects exist sequentially in the diameter direction in some cases, as the sequential defects of two blocks in each track. Therefore, it is also effective to use a method of controlling the combination of the conditions and the sequential numbers in the aforementioned judgment method, in accordance with the number of blocks included in the track in which the defective blocks exist.

As the other judgment method, for example, the address obtained from the optical pickup and a state of each kind of signal of reproduced data, etc., may be added to the judgment conditions. Further, it is also preferable to use a method of finding a position previously where the bubbles exist by irradiating the optical disk with a specific beam different from the beam for read-out processing, thereby deciding a state of irregularities of the surface from the reflected light.

Note that regarding the aforementioned judgment method and the judgment conditions, etc., the bubbles are set as a target, and by changing these conditions, etc., it is also possible to respond to the defects such as extending over wide range other than the bubbles.

Note that regarding the aforementioned judgment method and the judgment conditions, etc., the bubbles are set as a target. However, according to the present invention, the target is not limited to only the bubbles to be processed. Namely, for example, even when satisfying the conditions by the defects other than the bubbles such as a strong scratch, the areas having such defects are similarly treated as the sequential defect estimated areas.

When the bubbles are mixed in the optical disk, in consideration of the characteristics of the bubbles that not only the irradiated light but also the reflected light is influenced by the bubbles, and in a case of the optical disk, being the media including a plurality of recording layers in the aforementioned embodiment 1 and the embodiment 2, it is effective to use a method of similarly treating other layers as the sequential defect estimated areas, other layers being in the same radius position as that of the areas estimated as the sequential defect estimated areas. Specifically, as shown in FIG. 16, when the first recording layer 52 is formed on closer to the front surface side of the disk than the second recording layer 54, the laser is emitted from the side of the first protective layer 51, and therefore when the bubbles exist in the first protective layer 51, the areas of each layer that exists in the same radius position as that of the bubbles are remained to be easily influenced by the bubbles.

Figure 19:
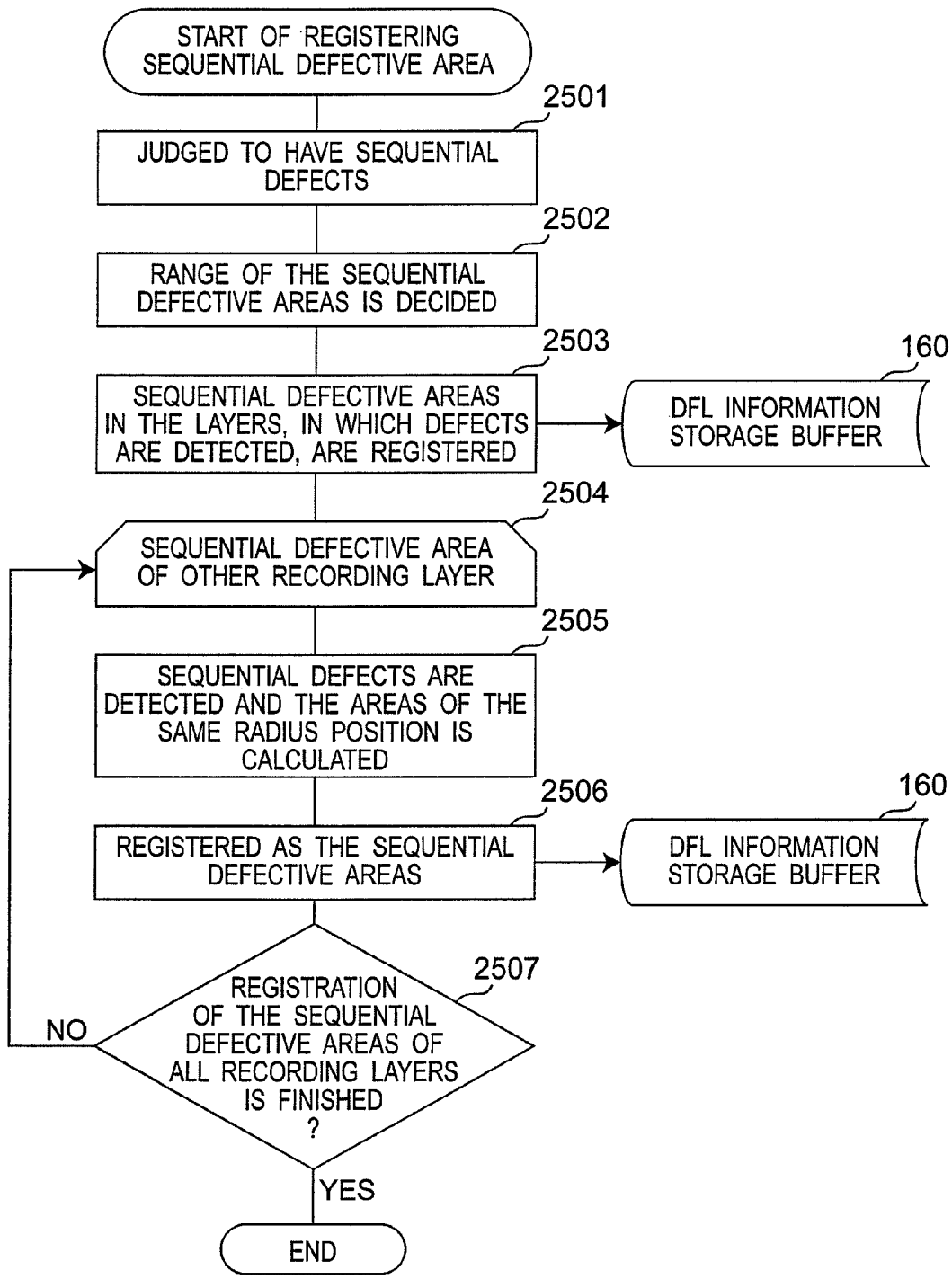
FIG. 19 is a flowchart explaining the procedure of a sequential defective area registration in the optical disk recording/reproducing device according to the embodiment 3 of the present invention.
Figure 20:
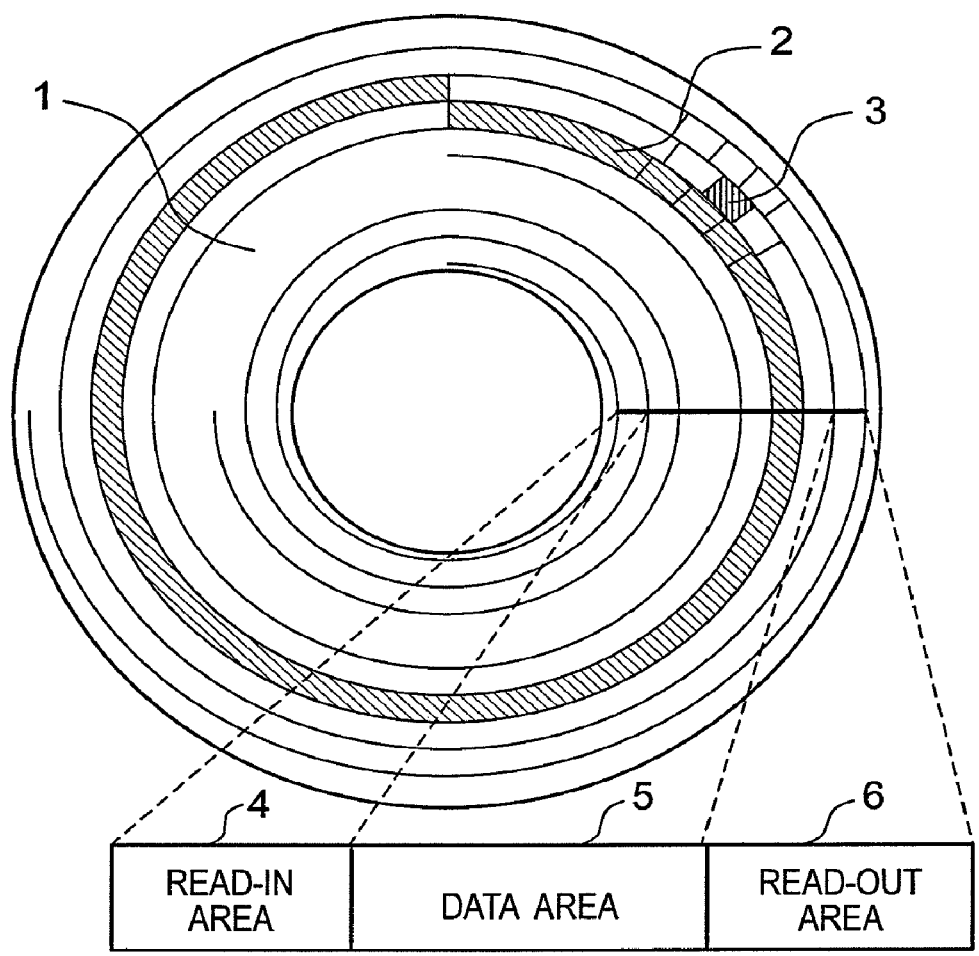
FIG. 20 is the block diagram showing the area of the general optical disk.

FIG. 19 is a flowchart briefly explaining the processing procedure when the sequential defective areas are detected in the optical disk, being the recording medium including a plurality of recording layers. Note that in the flowchart shown in FIG. 19, an example of a case in which the areas detected as the sequential defects are registered in the DFL.

Step 2501: in a certain recording layer, the sequential defect detecting conditions are satisfied, and therefore this recording layer is judged to have sequential defects. The processing of step 2407 of the aforementioned sequential defect judgment processing shown in FIG. 18 is restated in step 2501. Namely, the processing of step 2501 is the same as the processing from step 2401 to step 2407 of the sequential defect judgment processing shown in FIG. 18.

Step 2502: a range of the sequential defective areas is decided. More specifically, the system control part 110 judges all blocks included in the track of a prescribed range as the defective areas. In the embodiment 3, the track of the prescribed range is, for example, the track corresponding to 100 μm. Note that regarding decision of the range of the sequential defective areas, it is preferable to use a method of actually controlling the optical pickup, for example with a position judged to have sequential defects set as a reference, applying tracking thereto, and actually examining whether or not tracking error occurs. However, the present invention is not limited to such a range deciding method.

Step 2503: the range decided in step 2502 is registered as the sequential defective areas. More specifically, the logic recording/reproducing part 113 in the system control part 110 regards the obtained range as the sequential defective areas and registers this range in the DFL. More specifically, the range obtained in step 2502 is registered in the DFL information storage buffer 160.

Next, registration processing of the sequential defective areas is repeatedly performed to all recording layers (excluding a layer in which sequential defects are actually detected) that exist in this recording medium.

Step 2504: firstly, another recording layer different from the recording layer, in which the sequential defects are actually detected, is selected to be a judgment object of the sequential defective areas. From the next time, the recording layers excluding the recording layer, in which registration of the sequential defective areas is finished, is selected to be the judgment object.

Step 2505: in another recording layer different from the recording layer in which the sequential defects are actually detected, area information corresponding to the same radius position as that of the range detected as the sequential defective areas in step 2502 is calculated. Specifically, the logic recording/reproducing part 113 in the system control part 110 obtains the area information from head address information and end address information of the sequential defective areas obtained in step 2502, as the radius position information of this optical disk judged to be sequential defects. Based on this radius position information, the area information is calculated as the address information corresponding to the radius position in the recording layer, being the judgment object.

Step 2506: the areas calculated in step 2505 are registered as the sequential defective areas. More specifically, the logic recording/reproducing part 113 in the system control part 110 regards the range calculated in step 2505 as the sequential defective areas, and registers this range in the DFL. More specifically, the sequential defective areas calculated in the recording layer, being the judgment object, are registered in the DFL information storage buffer 160.

Step 2507: the system control part detects whether or not judgment of all recording layers is finished by registration in step 2506 of the sequential defective areas of the recording layer, being the judgment object. When all judgment is finished, the registration processing of the sequential defective areas is finished. Meanwhile, when the recording layer that is not yet judged exists, the processing is returned to step 2504, and the registration processing of the sequential defective areas is continued.

As described above, the processing procedure is performed, for detecting the sequential defective areas in the optical disk, being the recording medium including a plurality of recording layers.

As described above, according to the defect management method and the defect management device of the present invention, even if the bubbles are mixed-in the optical disk having a plurality of recording layers, the sequential defective areas in each recording layer are registered in the DFL information storage buffer 160, thus making it possible to provide the optical disk recording/reproducing device free of failure in recording/reproducing processing, with high reliability.

As described above, according to the present invention, it is possible to provide the defect management method and the defect management device with high reliability, capable of correctly controlling the recoding/reading-out processing of data even if a reading command is received in the middle of operation, while improvement in processing performance is achieved by the cache memory. Specifically, according to the present invention, even when recording processing is performed to the area in which the defective blocks exist sequentially or periodically under an influence of bubbles, it is possible to perform control, so that the sequential defective areas are estimated, an actual access is suppressed to this area, and actual access is performed to the alternate destinations. Therefore, according to the present invention, it is possible to provide the defect management method and the defect management device with high reliability, capable of preventing frequent alternate recording due to defects, in recording the data that is not yet recorded and held in the cache memory, while improvement in processing performance is achieved.

According to the present invention, the sequential defects extending in a wide range such as bubbles are estimated in accordance with prescribed conditions, and these areas are intentionally regarded and allocated as the sequential defective areas, so that the alternate destinations are also sequential, and are alternately registered in the defect list. By performing processing in this way, it is possible to control the recording request into the estimated areas, so as to be sequentially alternately recorded in the alternate destinations, and even when the defects exist sequentially according to a specific condition like bubbles, overhead due to alternate recording can be reduced. In addition, with the aforementioned structure of the defect management method and the defect management device of the present invention, possibility of time-out of command (request) processing from the host device such as the personal computer (PC) can be reduced.

Further, according to the present invention, even in the areas regarded as the sequential defective areas, when the reading request is given before the alternate recording is performed, by controlling so that not the alternate destinations but the areas that receive the request are read-out, recording/reproducing processing of data can be correctly performed, regardless of the kind of media such as rewritable media or write-once media.

INDUSTRIAL APPLICABILITY

The defect management method and the defect management device according to the present invention can be applied to the optical disk recording/reproducing device capable of performing recording/reproducing processing to the optical disk having a defect management function.

What is claimed is:
1. A defect management method of managing defects of an information recording media having a plurality of layers including a plurality of recording layers and in which recording/reproducing processing is performed in a block unit of an error correcting unit, said defect management method including,
when a defective block, which meets a prescribed defect judgment condition, is detected in one recording layer of the plurality of recording layers:
registering an area of a prescribed range decided based on the defective block detected in the one recording layer, in a defect list as a defective area; and
registering in the defect list, an area of a range in another recording layer, of the plurality of recording layers, corresponding to a position of a same radius as a radius of the prescribed range, as the defective area, wherein the information recording media includes a plurality of spare areas for replacing the defective block, wherein the plurality of spare areas, which successively allocate alternate blocks for the defective area as alternate destinations of the defective block included in the defective area, are preferentially used, and wherein, when the alternate blocks cannot be sequentially allocated to any one spare area of the plurality of spare areas as an alternate destination of the defective block included in the defective area, a spare area, of the plurality of spare areas, to which a longest sequential alternate block can be allocated as the alternate destination of the defective block is preferentially used.

2. The defect management method according to claim 1, wherein a block in which the recording/reproducing processing cannot be correctly performed under an influence of irregularities generated on the plurality of layers, which is caused by foreign matters of solid shape that exist in the plurality of layers, is decided as the defective block.

3. The defect management method according to claim 1, wherein, in the recording processing of recording data to a block, a case in which error due to factors of one of a tracking error and a failure of an address read occurs sequentially in a specific direction for a prescribed number of times is set as the prescribed defect judgment condition.

4. The defect management method according to claim 1, including the steps of:

registering in the defect list, a prescribed range backward of the defective block as the defective area, when the defective block, which meets the prescribed defect judgment condition, is detected during sequential recording; and registering in the defect list, a prescribed range frontward and the prescribed range backward of the defective block, which is set as a reference, as the defective area, when the defective block, which meets the prescribed defect judgment condition, is detected during a random recording.

5. The defect management method according to claim 1, wherein the prescribed range corresponds to a range in which a tracking error or a failure of an address read occurs in an inspection performed to an area decided based on the defective block as a reference.

6. The defect management method according to claim 2, wherein a size of the prescribed range corresponds to an area having a size corresponding to substantially three times a diameter of a foreign matter, with the foreign matter having a solid shape that exists in a layer, of the plurality of layers, set as a center.

7. The defect management method according to claim 1, wherein recording into the defective area is controlled as recording into an area of the alternate destination, by registering an alternate entry in the defect list before recording into the defective area, and the alternate entry includes alternate source position information which is a position of the defective block included in the defective area, alternate destination position information which is a position of a block in a spare area, and attribute information showing that the alternate destination is allocated.

8. The defect management method according to claim 1, wherein recording into the defective area is controlled as recording into an area of the alternate destination, by registering an alternate entry in the defect list before recording into the defective area, and the alternate entry includes alternate source position information which is a position of the defective block included in the defective area, alternate destination position information which is a position of a block in a spare area, and attribute information showing information registered before being recorded into the defective area.

9. The defect management method according to claim 1, wherein position information regarding the defective area is temporarily stored, and recording into a block included in the defective area is controlled as recording into an area of the alternate destination.

10. A defect management device for managing defects of an information recording medium having a plurality of layers including a plurality of recording layers, and for performing recording/reproducing processing in a block unit of an error correcting unit, the defect management device comprising:

a system control part which performs control of an overall device;

a memory part which stores each kind of information temporarily for performing the control by the system control part;

a motor part which rotates the information recording medium;

an optical pickup part which records data into the information recording medium or reads the data from the information recording medium;

a data buffer which stores data to be recorded and read-out data temporarily; and a DFL information storage buffer which holds a defect list having information regarding a defective block of the information recording medium, wherein, when the system control part detects the defective block in one recording layer of the plurality of recording layers, which meets a prescribed defect judgment condition, an area of a prescribed range decided based on the defective block detected in the one recording layer is registered in the defect list as a defective area, wherein an area of a range in another recording layer, of the plurality of recording layers, corresponding to a same radius position as that of the prescribed range is registered in the defect list as the defective area, wherein the information recording medium includes a plurality of spare areas for replacing the defective block, wherein the plurality of spare areas, which successively allocate alternate blocks for the defective area as alternate destinations of the defective block included in the defective area, are preferentially used, and wherein, when the alternate blocks cannot be sequentially allocated to any one spare area of the plurality of spare areas as an alternate destination of the defective block included in the defective area, a spare area, of the plurality of spare areas, to which a longest sequential alternate block can be allocated as the alternate destination of the defective block is preferentially used.

11. The defect management device according to claim 10, wherein the system control part applies processing to a block not capable of performing the recording/reproducing processing normally under an influence of irregularities generated on a layer of the plurality of layers due to a foreign matter having a solid shape that exists in the layer of the plurality of layers, such that the block processed by the system control part is decided as the defective block.

12. The defect management device according to claim 10, wherein the system control part judges that, in the recording processing of recording data to a block, the prescribed defect judgment condition in a case in which an error due to factors of one of a tracking error and a failure of an address read occurs sequentially in a specific direction for a prescribed number of times.

13. The defect management device according to claim 10, wherein, when the system control part detects the defective block, which meets the prescribed defect judgment condition during a sequential recording, a prescribed range backward of the defective block is registered in the defect list as the defective area, and when the system control part detects the defective block, which meets the prescribed defect judgment condition during a random recording, a prescribed range frontward and the prescribed range backward of the defective block set as a reference are registered in the defect list as the defective area.

14. The defect management device according to claim 10, wherein the prescribed range is a range in which a tracking error or a failure of an address read occurs in an inspection performed to an area decided based on the defective block.

15. The defect management device according to claim 11, wherein the prescribed range is an area having a size corresponding to substantially three times a diameter of a foreign matter, with the foreign matter having a solid shape that exists in a layer, of the plurality of layers, set as a center.

16. The defect management device according to claim 10, wherein recording into the defective area is set as recording into an area of the alternate destination, by registering an alternate entry in the defect list before recording the alternate entry into the defective area, and the alternate entry includes alternate source position information which is a position of the defective block included in the defective area, alternate destination position information which is a position of a block in a spare area, and attribute information showing an allocation of the alternate destination.

17. The defect management device according to claim 10, wherein recording into the defective area is set as recording into an area of the alternate destination, by registering an alternate entry in the defect list before recording the alternate entry into the defective area, and the alternate entry includes alternate source position information which is a position of the defective block included in the defective area, alternate destination position information which is a position of a block in a spare area, and attribute information showing that information is registered into the defective area before being recorded into the defective area.

18. The defect management device according to claim 10, wherein position information regarding the defective area is temporarily stored in the memory part, and recording into a block included in the defective area is set as recording into an area of the alternate destination.

* * * * *